(12) United States Patent
Wilde et al.

(10) Patent No.: US 11,967,221 B2
(45) Date of Patent: Apr. 23, 2024

(54) EMERGENCY DEVICE

(71) Applicant: ICOE TECHNOLOGY LTD., Hampton (GB)

(72) Inventors: Benjamin Wilde, Hampton (GB); Daniel Hook, Hampton (GB)

(73) Assignee: ICOE TECHNOLOGY LTD., Hampton (GB)

( * ) Notice: Subject to any disclaimer, the term of this patent is extended or adjusted under 35 U.S.C. 154(b) by 0 days.

(21) Appl. No.: 18/320,557

(22) Filed: May 19, 2023

(65) Prior Publication Data

US 2023/0377449 A1 Nov. 23, 2023

Related U.S. Application Data

(63) Continuation of application No. PCT/GB2022/052733, filed on Oct. 27, 2022.

(30) Foreign Application Priority Data

Oct. 28, 2021 (GB) .................................... 2115543
Aug. 19, 2022 (GB) .................................... 2212100

(51) Int. Cl.
*G08B 27/00* (2006.01)
*G08B 25/01* (2006.01)

(52) U.S. Cl.
CPC ......... *G08B 27/001* (2013.01); *G08B 25/016* (2013.01)

(58) Field of Classification Search
CPC .................................................... G08B 27/001
See application file for complete search history.

(56) References Cited

U.S. PATENT DOCUMENTS

| 2015/0087947 A1 | 3/2015 | Freeman et al. |
| 2019/0066538 A1* | 2/2019 | Chao .................. G16H 40/63 |

FOREIGN PATENT DOCUMENTS

| JP | 2013152613 A | 8/2013 |
| WO | 2016114861 A1 | 7/2016 |
| WO | 2017055953 A2 | 4/2017 |

OTHER PUBLICATIONS

International Search Report, dated Feb. 3, 2023, issued in priority International Application No. PCT/GB2022/052733.

* cited by examiner

*Primary Examiner* — Travis R Hunnings
(74) *Attorney, Agent, or Firm* — Saul Ewing LLP

(57) ABSTRACT

There is provided an emergency device comprising: a housing, in which the housing includes a speaker and a memory for storing an audio recording or script for guiding an end-user through an emergency. The housing has a generally cylindrical shape. The emergency device includes a single recessed button or switch located on the front face of the housing. The device is configured to play the audio recording or script via the speaker upon detection of a trigger condition, such as the button or switch being activated.

29 Claims, 28 Drawing Sheets

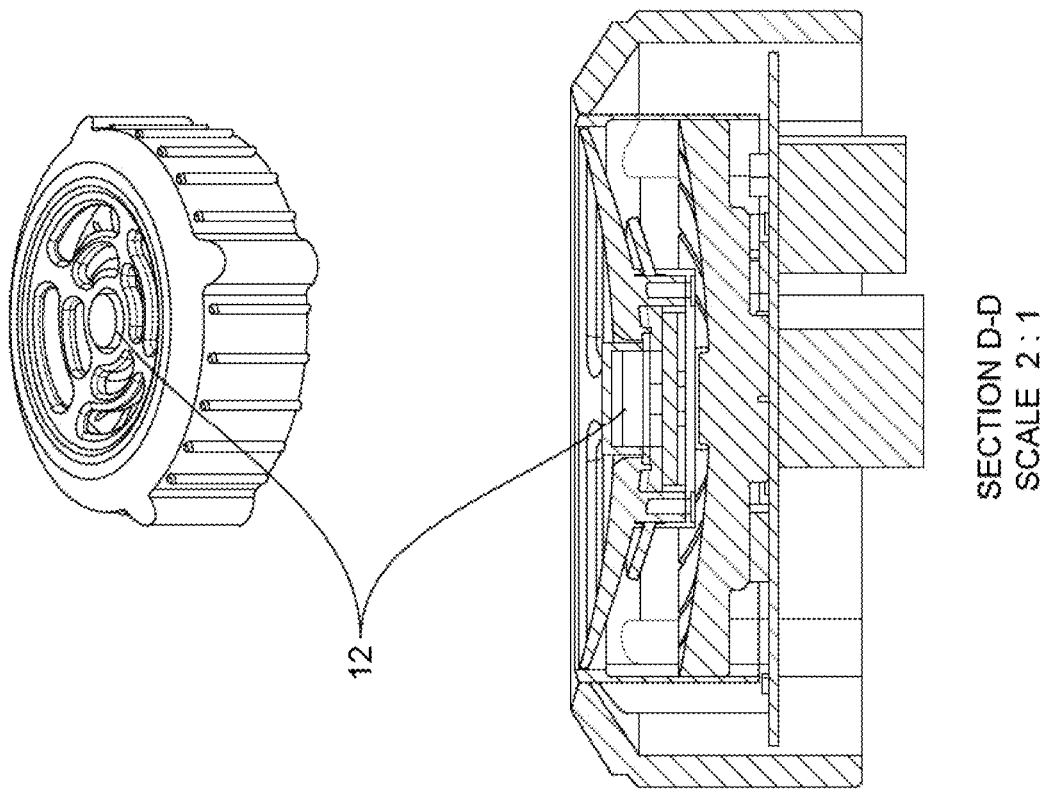
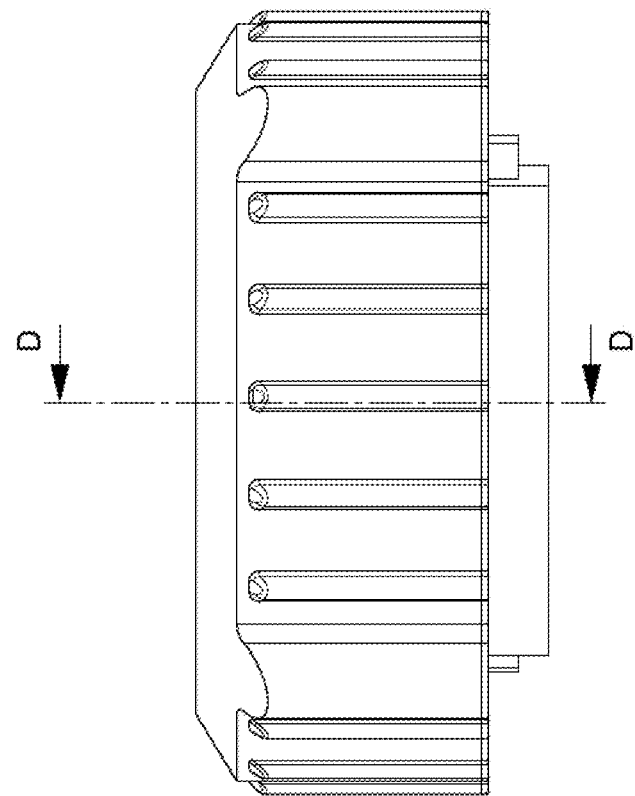
FIG. 3

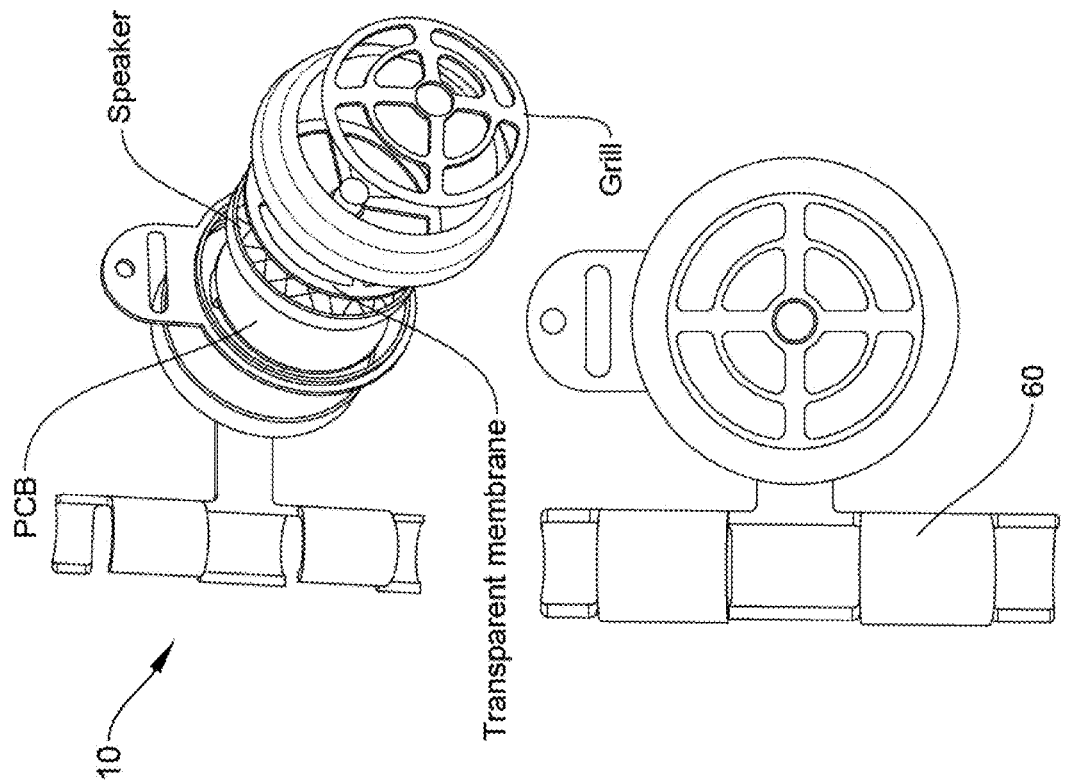
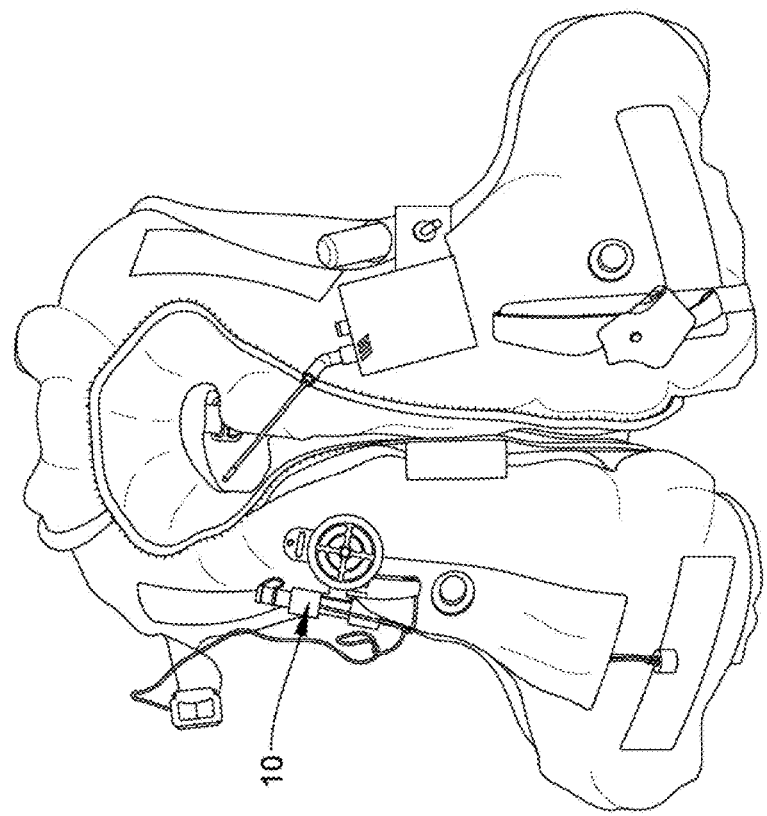
FIG. 6

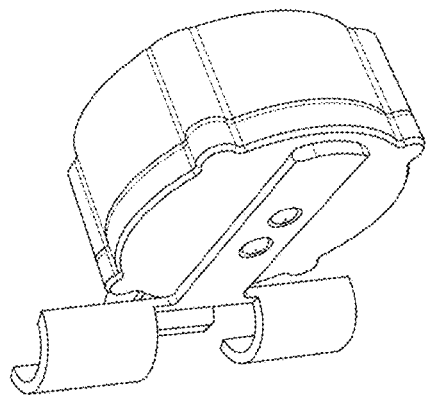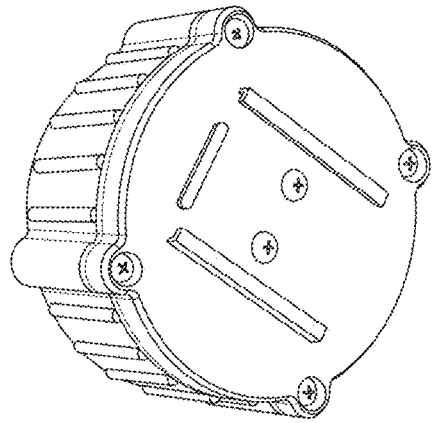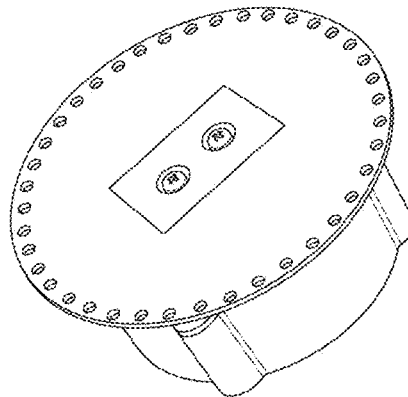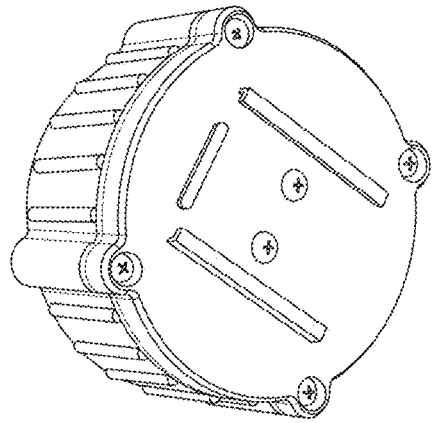

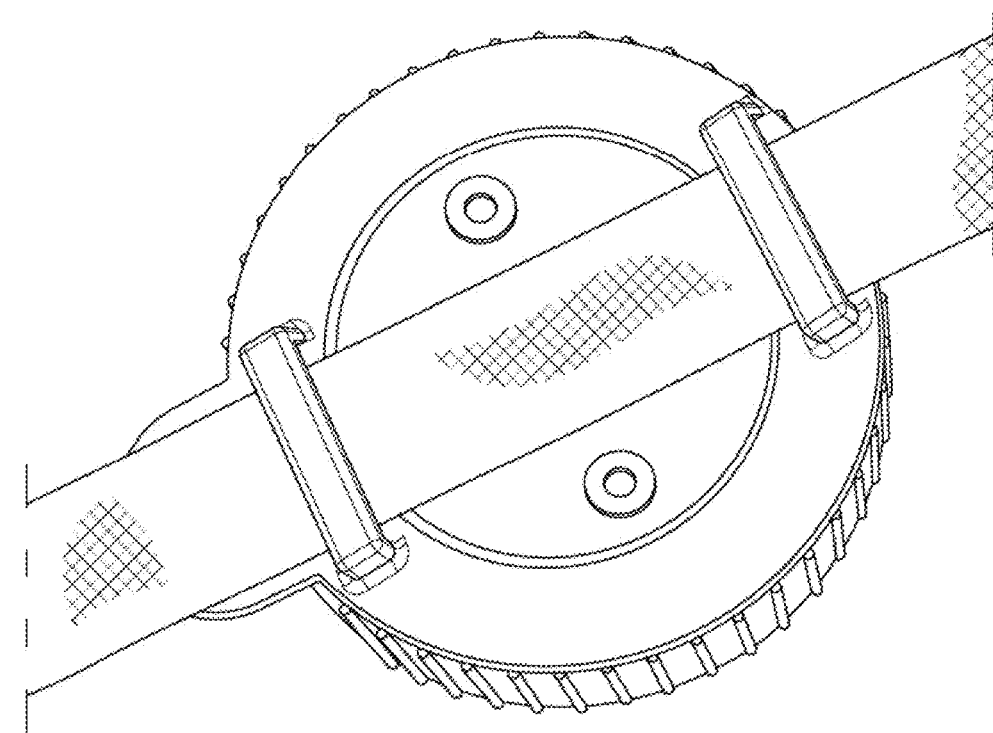
Rubber boot
& Strap retention
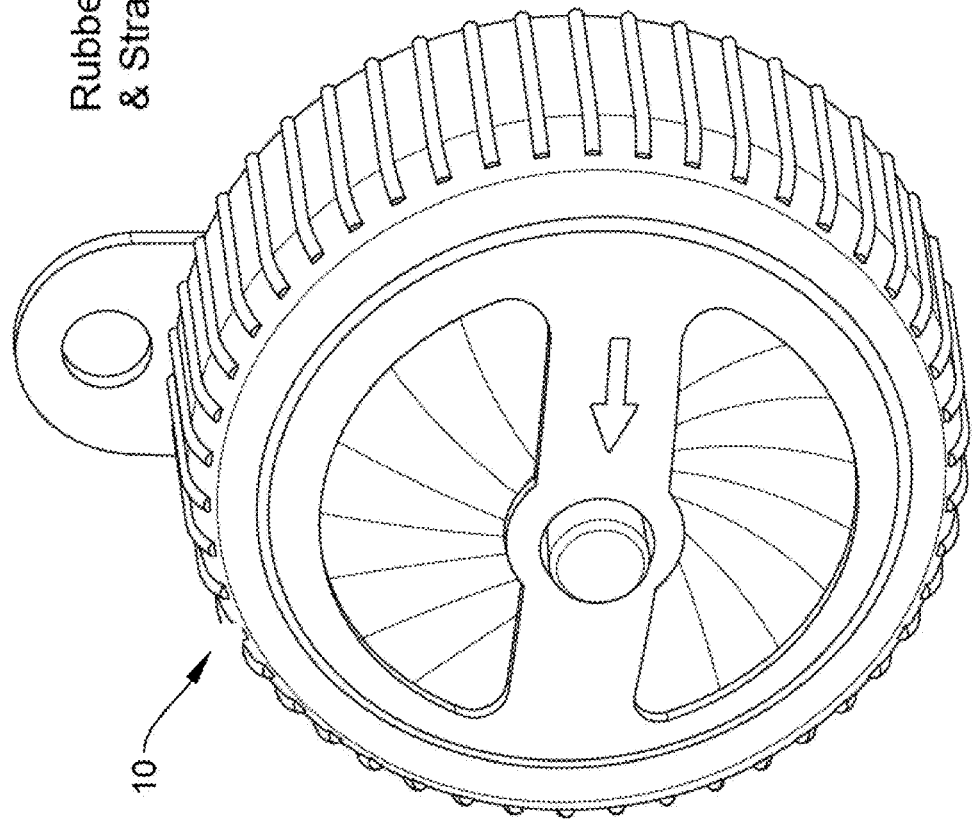
FIG. 8

FIG. 17 iCOE

Overview | Configuration

System Information and Cofiguration

| | |
|---|---|
| Current user level | ADMINISTRATOR |
| Current date/time | 25/9/21 13:14:34 |
| Software version | 0.01.01 |
| Serial number | 04A3E7B2893F |
| Last location | 5.23456 N 51.34567 W |
| Battery level | 86 % |
| Owner name | Joe Bloggs |
| Owner location | Felspar (boat) |
| Owner telephone | 0777 1234567 |

Save Changes

Device Cofiguration

| | | |
|---|---|---|
| Button activate period | 50 | Range 50-300ßmS |
| Button deactivate period | 3000 | Range 500-10000mS |
| Impact trigger level | 5 | Range 1-16g |
| Beacon flash rate | 1000 | Range 100-30000mS |
| Announcement volume | 6 | Range 1-10 |
| Enable announcement | ☑ | |
| Enable beacon | ☑ | |
| Enable location | ☑ | |

Save Changes

Announcement Upload

Choose file   No file chosen

Upload file

Copyright © 2021 iCOE Limited

FIG. 26

EMERGENCY DEVICE

CROSS-REFERENCE TO RELATED APPLICATIONS

This application is a continuation of International Application No. PCT/GB2022/052733, filed on Oct. 27, 2022, which claims priority to Gb Application No. 2115543.7, filed on Oct. 28, 2021, and GB Application No. 2212100.8, filed on Aug. 19, 2022, the entire contents of each of which being fully incorporated herein by reference.

BACKGROUND OF THE INVENTION

1. Field of the Invention

The field of the invention relates to an emergency device for guiding an end-user through an emergency and to related systems and methods.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Technical Background

In times of emergency and life-threatening situations, victims and bystanders often panic due to lack of knowledge and/or sufficient training. Subsequent loss of life or serious injury may be avoidable through the delivery of accurate emergency instruction.

Emergencies require immediate response. Defibrillators are sometimes programmed so that when the defibrillator is opened, instructions on how to use the defibrillator are outputted via a speaker immediately. The user may then be talked through the process of how to use the defibrillator, such as undressing the patient if required, applying the pads then activating the shock mechanism.

However, available emergency systems are often not flexible and cannot be adapted to many use case emergency scenarios. There is an unmet need to improve the availability of life saving instructions in a wide range of emergency.

SOS emergency assistance buttons are also available. They have been designed for example for the elderly and may be worn on a wrist or as a pendant. In an event of emergency, the button may be pressed to raise an alarm. However, SOS emergency assistance buttons do not automatically provide clear instructions depending on the emergency and do not provide feedback alerting a user that the button has not been correctly pressed. Additionally, such buttons are also easily pressed accidently even when there is no emergency.

When employers or workers must deal with a workplace emergency, proper planning is also necessary. Comprehensive plans for handling emergencies in a workplace that are compliant with safety rules or regulations are required. Emergency response procedures often consist of a check list of appropriate actions to be undertaken depending on the type of emergency. When accidents occur, each step undertaken by emergency responders needs to be properly recorded. An accident may also result in an investigation being carried out to find out what happened. However, it may be challenging to check whether the appropriate emergency response procedure was followed.

There is therefore also a need for a system that would allow verification after the occurrence of an emergency that compliance with safety rules or regulations have been met.

SUMMARY OF THE INVENTION

An implementation of the invention is an emergency device comprising:
  a housing, in which the housing includes a speaker and a memory for storing an audio recording or script for guiding an end-user through an emergency, in which the housing has a generally cylindrical shape;
  a recessed button or switch located on the front face of the housing;
  the device being configured to play the audio recording or script via the speaker upon detection of a trigger condition, such as the button or switch being activated.

The following key features are implemented in the emergency device or system:
  Emergency device has a cylindrical form factor with a recessed front button or switch.
  Emergency device stores and/or transmits an audio signature or code given by an emergency responder, to confirm or verify compliance by that responder, e.g. that they have listened to and understood the audio recording or script.
  Emergency device stores and/or transmits a voice memo or recording given by a user or responder relating to an action that needs to be taken with the device or the local environment;
  Emergency device stores and/or transmits an audit trail of all interactions with the device.
  Emergency device includes a rechargeable battery that is powered/charged from a standard charging socket, such as a USB (e.g. USB-C).
  Emergency device is pre-programmed with several emergency scripts or instructions and the device may automatically select the appropriate script based on the detection of a specific trigger condition.
  Emergency device includes an extension unit that extends from or is attached onto the device and that provides additional functionality.
  Emergency device includes a biometric sensor.
  Emergency device includes a GNSS receiver and is configured to transmit its location to a cloud or central server.
  Emergency system includes multiple emergency devices mounted on a panel, each emergency device being powered/charged from a charging socket, such as a USB.
  Emergency system including multiple emergency devices, that can all be configured via a web application.
  Emergency system includes multiple emergency devices grouped together via a communication network.
  Emergency device attached or integrated to a life jacket.
  A case for an auto-injectable device that is configured to automatically play an audio recording or script via the speaker when the case is opened.
  Appendix E is an expanded discussion of these Features.

BRIEF DESCRIPTION OF THE FIGURES

Aspects of the invention will now be described, by way of example(s), with reference to the following Figures, which each show features of the invention:

FIG. 3 provides a cross section of the emergency device, including a recessed button located on the front surface of the housing.

FIG. 6 provides another illustration of the emergency device integrated with or located on a life jacket.

FIGS. 7A-D provide several options for fitting or attaching various extension unit onto the rear surface of the housing.

FIG. 8 shows another emergency device in which the rear surface of the housing includes strap retainers for securing a strap onto the emergency device.

FIG. 17 shows a user interface displaying a list of devices.

FIG. 26 shows an example of a screenshot of a configuration page.

DETAILED DESCRIPTION

The present invention is based on the insight that in emergency situations people respond best if they receive immediate, clear audible instructions, as opposed to written instructions or relying on memory.

To test this insight, we designed two small studies. The first study measured the reactions of people in a situation where they had to deliver CPR to a dummy. Subjects were asked to perform CPR and were then either given a standard script via audible instruction from an emergency device or they were to rely on memory. The total number of participants in the first study was 109, with 56 participants being given audio instructions and 53 participants having to rely on memory. The average quality score (self-assessment out of 10 with 10 being the highest), was 7.2 for the participants given audio instructions compared to 4.6 for the participants having to rely on memory. The average confidence score (self-assessment out of 10 with 10 being the highest), was 7 for the participants given audio instructions compared to 4.2 for the participants having to rely on memory. Overall, 100% of the audio instruction participants found the audio instructions helpful.

The second small study was skill-based, and participants received instructions detailing how to tie a Bowline knot. The instructions were either delivered audibly through an emergency device or written onto a piece of paper. No images were used with the written paper instructions. The total number of participants in the second study was also 109, with 56 participants being given audio instructions and 53 participants being given written instructions. 76% of the participants with audio instructions were able to successfully complete the knot in 150 s, as compared to 40% of the participants with written instructions. The average quality score (self-assessment out of 10 with 10 being the highest), was 7.01 for the participants with audio instructions compared to 4.2 for the participants with written instructions. The average confidence score (self-assessment out of 10 with 10 being the highest), was 6.5 for the participants with audio instructions compared to 3.9 for the participants with written instructions. Overall, 84% of the audio instruction participants found the audio instructions helpful.

Both studies found a clear preference for the participants towards the use of audible instructions as compared to having to rely on memory or being given written instructions. Strikingly 100% of subjects who receive audible instructions in the CPR study reported finding it useful for the completion of the task. Additionally, 84% of those receiving audible instruction in the skill-based study reported finding it useful. In both studies the average self-reported score again identified the audible instructions as having a significantly positive effect on their completion of the task when compared to those who had to rely on memory or written instructions.

Figure 1:
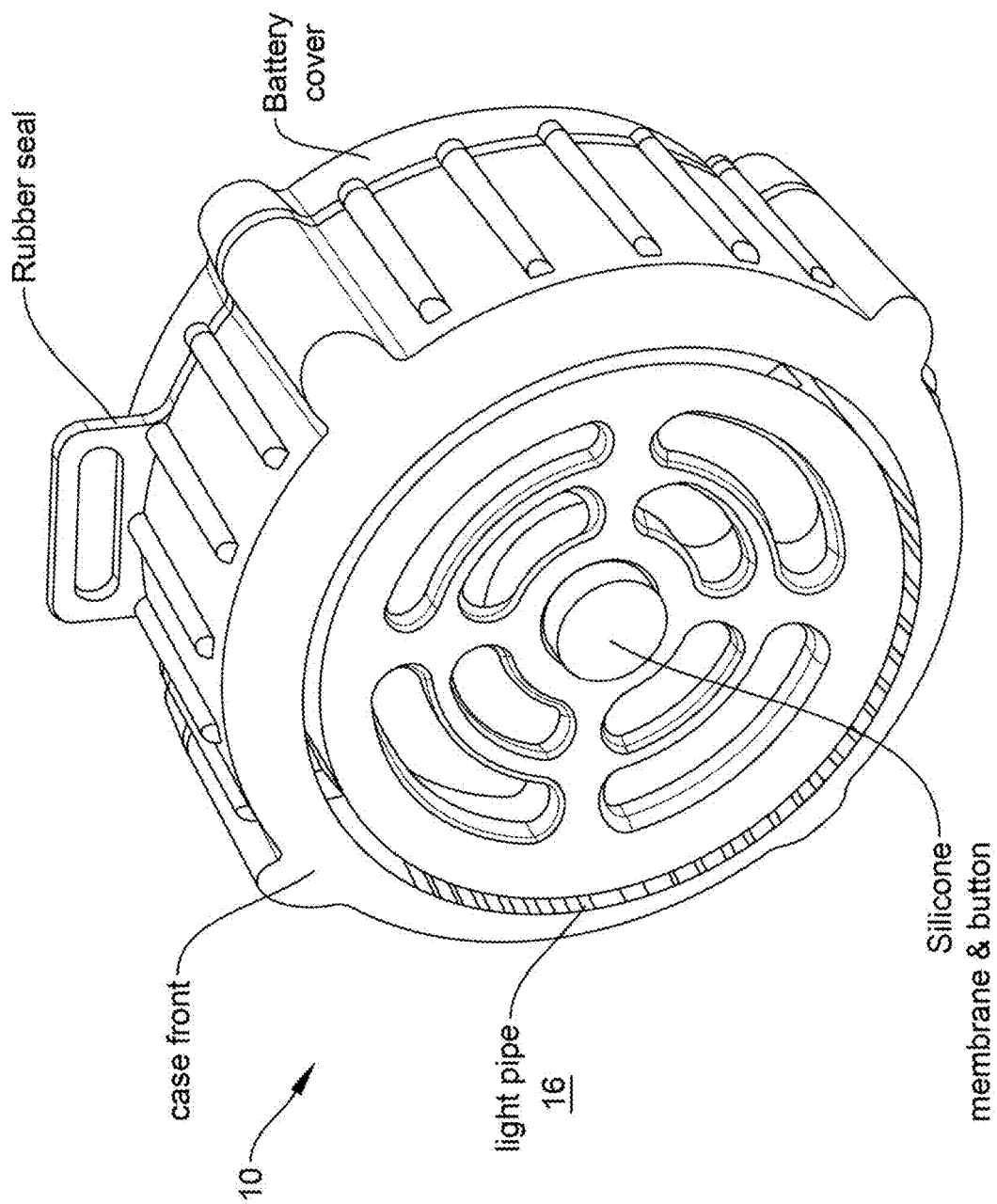
FIG. 1 shows an illustration of a robust emergency device 10.
Figure 2:
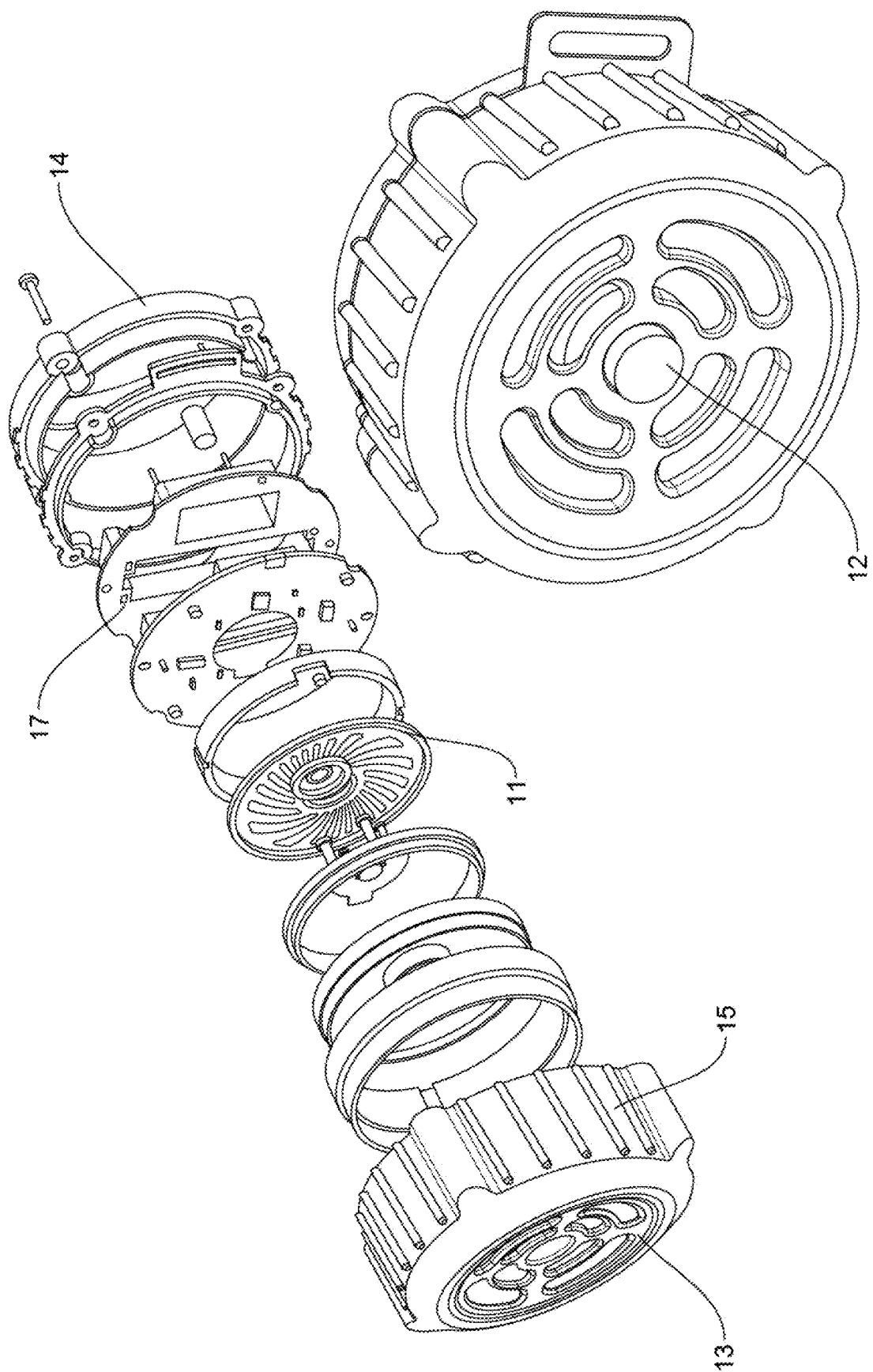
FIG. 2 provides an exploded view of the emergency device of FIG. 1

FIG. 1 shows an illustration of a robust emergency device 10 including a speaker 11 that implements the invention. FIG. 2 provides an exploded view of the emergency device of FIG. 1. In this example, the emergency device includes a generally cylindrical shaped housing and includes a button 12 located centrally on the front face of the housing 13—positioned to present a clear 'call to action' to any user, e.g. emergency responder. The button 12 is typically the only prominent button on the device, making it simple and clear to an emergency responder that the only way to interact with the device is to push the button; this saves time and naturally that can be critical in an emergency. When the button is pressed or a trigger condition is detected, an audio output is provided via the speaker. The audio output includes audible instruction guiding an end-user through the steps needed to be taken in a specific emergency, such as an airway blockage, or the need for CPR etc.

The specific form factor of a generally cylindrical shaped housing that includes an activation button located centrally on the front face of the housing is just one possible implementation. As will be apparent below, there are a wide number of trigger conditions that can be detected, such as pressure, water, mechanical, heat, smoke, chemical detection; emergency devices that trigger under these conditions do not necessarily require this form-factor. Another trigger condition may include when a specific threshold of a measured vital sign has been reached, the pin from a fire extinguisher being pulled, or the opening or handling of a separate device. As another example, the emergency device includes a barometric pressure sensor that provides automatic activation of the device in water or environmental pressure change (eg—cabin pressure).

The emergency device may also be configured to store or transmit an audio signature or code (e.g. an emergency responder who has just finished using the device could be asked to speak their name to the device) to verify compliance with the instructions given by the device. The device may be configured to play the audio recording or script when instructed to do so by a person, and to receive, after the audio recording or script has been played, an audio signature, code or recording of that person speaking their name, to verify that the person has listened to the audio recording. The audio recording or signature or code is also automatically associated with a tamper-resistant or tamper-evident timestamp.

Alternatively, when an audio recording or script has finished, the device may prompt the person to record their audio signature, code or name and the device may store or transmit that audio recording or signature and code.

The device may also store or transmit a voice memo or recording given by a user or responder relating to an action that needs to be taken with the device or the local environment; for example, a user could leave a voice memo or recording or other form of note that the device is working correctly (e.g. generating a clear voice instruction when instructed to do so), or that there is an issue that needs to be attended to—e.g. that the device needs attention, or that there is a system fault, or that there is a potentially dangerous situation nearby. A service department responsible for the emergency device can be automatically sent the note and can then take appropriate action; a clear, verifiable audit trail of the detection of the issue, and by whom and when, and the communication and receipt of that note by the relevant service or maintenance department is generated.

The device or connected cloud or server may automatically send an alert when there is a risk that the script has not been completed or if there is a possibility of non-compliance.

The device may also be configured to start recording audio content when instructed to by a person, such as when a pre-programmed voice command has been spoken by the person.

Hence the emergency system improves traceability and access to emergency data and information following an accident. Advantageously, the emergency system provides instant feedback which will help in understanding the origin of an accident, analyzing the steps undertaken during an emergency and identifying any gaps in emergency response procedures.

FIG. 3 provides a cross section of the emergency device, including a recessed button or switch located on the front surface of the housing. With a recessed button, it is difficult for an end-user to accidentally activate the button such as by casually handling the emergency device. This reduces the probability that the button will be activated inadvertently or accidently.

The button 12 may be a push button switch, such as a momentary or tactile switch, with for example a maximum response time of about 50 ms. Alternatively, the emergency device may include any other one-handed release mechanism instead of or in addition to the push button.

The housing may be made using injection moulding, such as ABS. The housing has a front surface 13, a rear surface 14 and side walls 15. The front surface includes one or more openings that allow the audio output delivered by the speaker 11 to be directed towards a user. The side walls 15 of the housing are configured to be comfortably held by an end-user and may be made of a flexible material, such as rubber or silicon. The side walls may include tactile features, such as bumps, that help define the exterior of the housing.

The emergency device also includes one or more visual indicators that indicate one or more device related status information, such as battery status, alarm condition, device mode, wireless mode, speaker mode, emergency script activation. The visual indicator may include various colours and light patterns that are fully configurable by an end-user.

In the example provided, the visual indicator includes a high-power LED beacon light visible as a ring 16 around the front surface of the device.

For example, a blue LED indicator may provide the following status: OFF indicating the battery is discharged or the device is in sleeping mode; flashing slowly indicating announcement playback, flashing fast indicating that the wireless mode has been activated such as WiFi WPS, flashing every 10 seconds indicating a low state of charge of the battery. A white LED indicator may also provide the following alarm or activation status: OFF indicating no alarm condition, and flashing every second indicated an alarm condition.

Additionally, a visual indicator may also automatically turn on when a trigger condition is detected. This may help locate the housing and/or button of the emergency device, as well as the person in need of assistance.

The emergency device may include a rechargeable battery with a standby battery lifespan of up to 2 years including a multiple on/off function to demonstrate or correct if the system has been activated in error.

The rechargeable battery, such as a 5.2Ah Lithium-Ion battery or a 3.7AA Lithium-Ion battery, may be charged from a charging socket, such as USB-C. The housing therefore includes a power charging circuit for controlling the charging of the rechargeable battery and control electronics powered by the rechargeable battery. The control electronics include a processor that is chosen for its power management capabilities to extend the battery life of the device. The device is energised when the rechargeable battery is inserted into the battery compartment 17. By default, the device may enter a low power sleep state, until a trigger condition is detected. If the trigger condition detected corresponds to an emergency, a pre-stored verbal instruction is played to the user to guide them through a specific emergency procedure.

Alternatively, the emergency device may also be charged wirelessly, such as using inductive wireless charging. Hence energy may be transferred from a wireless charger or transmitter to a receiver coil located inside the emergency device, where it is used to power the battery inside the emergency device.

Although the housing of the emergency device is illustrated to be cylindrical in shape, the housing may be constructed in a variety of shapes. For example, the housing may be shaped to specifically integrate into or attach onto another device, such as a life jacket, or an auto-injectable device's case, such as an EpiPen's case or any other medical devices.

Figure 4:
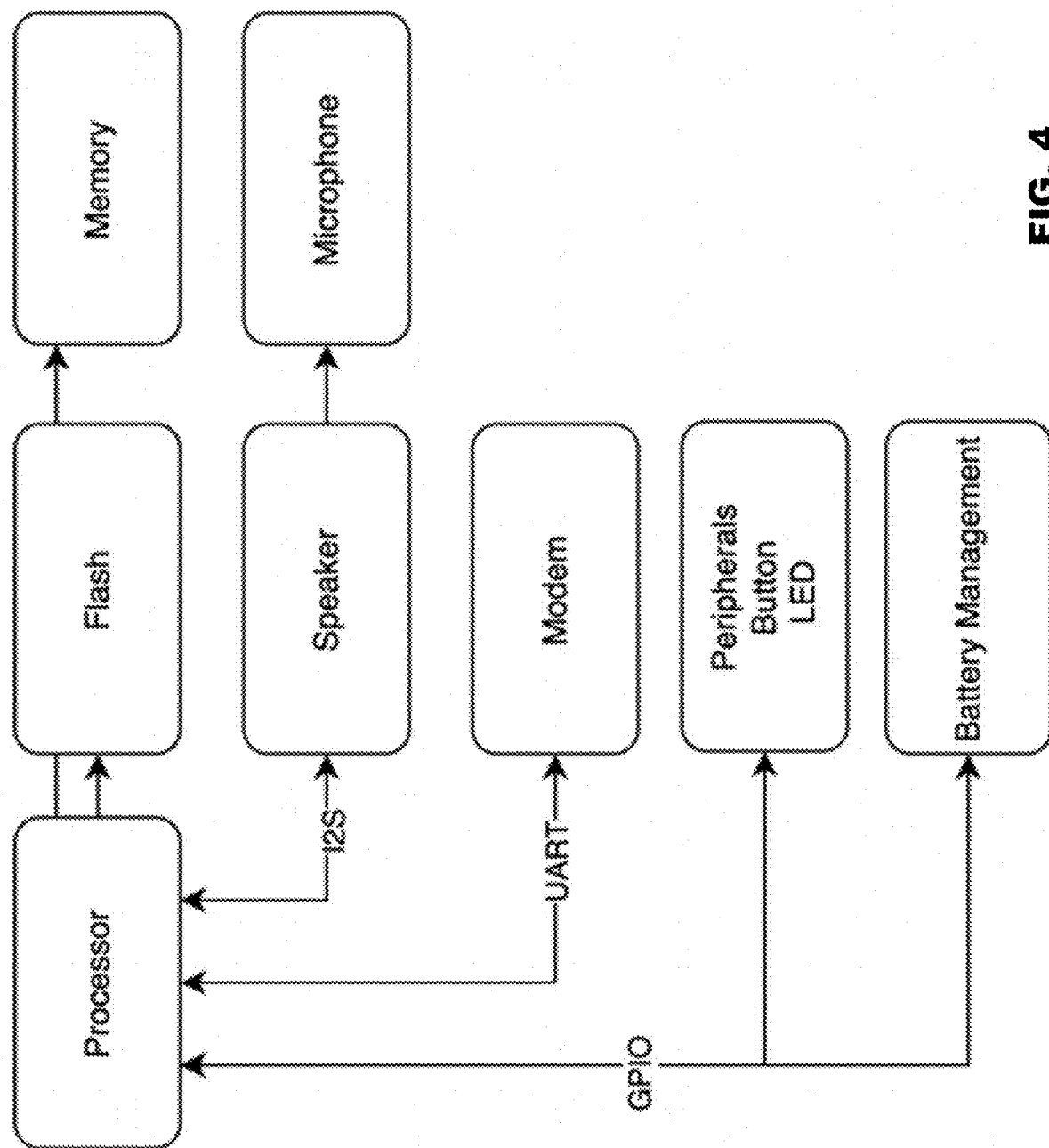
FIG. 4 provides a diagram illustrating the main hardware components of the emergency device.

FIG. 4 provides a diagram illustrating the main hardware components of the emergency device. A custom-designed board includes a microprocessor with extended storage and memory, a modem (NBIOT & LTE), a speaker, a microphone.

The speaker can deliver an audio output that may vary from about 80 to 120 decibels (dB). The sound level of the audio output may be dependent on the emergency scenario.

As an example, the speaker may be a 57 mm Mylar cone 2W with the following properties: output power 1.5W into 4Ω max, total Harmonic Distortion (THD)<1% @ 1.5W, signal to noise ratio (SNR) 110 dB and sound pressure level (SPL) 100 dB at 1 m.

The device may be configured to determine its geo-location position using a GNSS receiver configured to receive a signal such as a GPS, GLONASS or Beidou signal. The GNSS receiver may have the following parameters: 72 channel acquisition; 33 channels tracking; accuracy of 2.5 m GPS & GLONASS (CEP); Open sky TTFF Hot start<2 seconds, Cold start 26 seconds average; Reacquisition<2 seconds; Sensitivity—163 dBm tracking.

When the device has determined or estimated its geo-location, the device may be configured to transmit its geo-location to a cloud or central server. This may be performed automatically when the device has been activated by a trigger condition.

The device may also include an additional button, such as an internal boot button that allows the main processor bootloader to be started and a new software to be downloaded over a 'PROGRAM' interface.

The device may further include a sensor network comprising various sensors that are configured to detect a trigger condition. The sensor network may comprise one or more of the following: pressure sensor, a 3-axis accelerometer, inertial, temperature, mechanical, water, humidity or sound sensor.

The sensor network may also include biometric sensors or environmental sensors to obtain biometric information of the user or environmental information of the environment in which the user is located.

The emergency device may include real-time feedback for biometrics data.

The sensor network may also include a vital sign sensor, such as an optical vital sign sensor, to measure or determine a user's vital signs.

Further, using the sensor network, a live monitoring subsystem may be implemented that assess risk in real time thereby acting preventatively instead of reactively.

As highlighted above, in emergency situations people respond better to clear, audible instructions rather than memory or written instructions. The audio output is therefore configured to deliver clear expert care advice via step-by-step instructions.

The audio output delivered is not limited to step-by-step instructions or medical related information. It may include any other information, such as device related status. Examples include whether the device is working correctly, or whether the battery has been inserted.

The device may be pre-programmed with several emergency scripts and the device may automatically select the appropriate script based on the detection of a specific trigger condition. A list of scripts for each device may be stored in a library.

The emergency device may include a communication chip, such as a Bluetooth chip which can be used to communicate wirelessly with connected devices.

Advantageously, the emergency device can be fully customised or configurable, thereby improving the safety of any environment. The device may be configurable wirelessly, such as over a WiFi or Bluetooth wireless connection.

Wireless technology such as WiFi allows the product to connect to a local network to allow different vocal audio files to be uploaded and provide the devices current GPS position and alarm status when triggered. Software has been developed to have the capability to upload either pre-set instructions or a customised script, details are provided below.

The device may be connected to a local WiFi network to allow it to access the internet for software updates or send geo-location or other positional information to a web-based server following the detection of a trigger condition. WiFi Protected Setup (WPS) may be used to connect the emergency device to a local WiFi network. The device may start a WPS mode by for example pressing and holding the centre button for at least five seconds, when the device is inactive, whereupon the visual indicator may flash fast. Pressing the WPS button on the local router connects the device to the router and the visual indicator will then extinguish. If the router WPS button is not pressed within for example two minutes the device will exit WPS mode and the visual indicator will extinguish.

A use case example of the operation of the emergency device is now provided. Momentarily depressing the centre button on the unit for about 50 ms, or the onboard motion sensor detecting an impact of greater than 5 g, will activate the unit and start playback of a pre-programmed announcement, the LED beacon will flash every second and this will continue until the battery is removed, is exhausted or the device is deactivated by depressing and holding the centre button for three seconds whereby it will re-enter the low power sleep state once more.

During activation the current GPS position will be constantly updated and if the device is within range of a pre-configured WiFi router, and can still connect to it, the device will upload GPS time/date and positional information to a web-based server, see Appendix B JSON Configuration and status format.

An internal web server may be accessed at any time when a device has been activated (see 'Appendix A. Web server Configuration'). Upon connection to the web server the current announcement and beacon flashing may stop. Once reconfiguration or file upload has been completed via the web server, the emergency device may re-enter a low power sleep state.

Due to its compact and simple design, the emergency device can be used in a wide variety of environments and emergency scenarios from cold water immersion to choking, electric shock and industrial safety emergencies. A wider list of applications is provided in Appendix C.

The emergency device may be configured to be shock-proof, waterproof, fire and/or temperature resistant.

Advantageously the device is configured to operate over a wide range of temperatures, such as from about −20 degree Celsius to +85 degree Celsius, and over a humidity of up to 100%.

Many individual emergency devices may also communicate via a communication network. The communication network may be used to allow the emergency devices to share data.

Further, the many individual emergency devices may be grouped together via the communication network, such as WiFi/GPS/Bluetooth to provide an additional safety feature in addition to knowing in a mass rescue if all have been accounted for.

Cold Water Immersion Use Case

Cold water shock causes the blood vessels in the skin to close, which increases the resistance of blood flow. Heart rate is also increased. As a result, the heart must work harder, and blood pressure goes up. Cold water shock can therefore cause heart attacks, even in the relatively young and healthy.

The sudden cooling of the skin by cold water also causes an involuntary gasp for breath. Breathing rates can change uncontrollably, sometimes increasing as much as tenfold. All these responses contribute to a feeling of panic, increasing the chance of inhaling water directly into the lungs. It only takes half a pint of sea water to enter the lungs for a fully grown man to start drowning. Panic is the biggest cause of death in cold water immersion.

The emergency device may be used for water safety to deliver lifesaving instructions in the event of sudden immersion.

Figure 5:
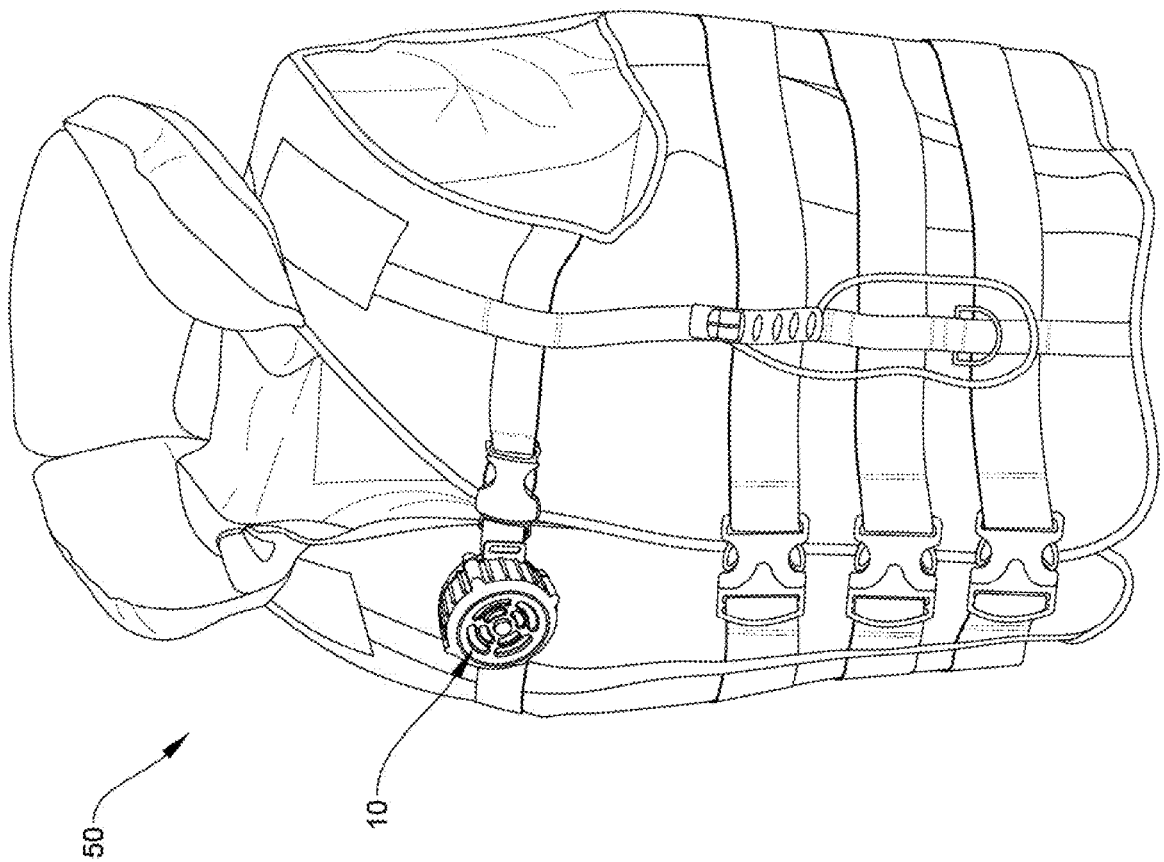
FIG. 5 provides an illustration of the emergency device integrated with or located on a life jacket.

FIG. 5 provides an illustration of the emergency device 10 integrated with or located on a life jacket 50.

The emergency device 10 may then be configured to deliver lifesaving instructions which will help maintain the subject calm and allow the subject to get into positions which will help preserve body heat and maintain airways. It can also provide instructions on floatation and buoyancy all of which increase the chances of survival.

The emergency device 10 may be easily attached to any of the following, but not limited to:
  Life jackets;
  Offshore jackets;
  Life Rafts and survival packs;
  Life boats sea survival;
  Vessel safety;
  Naval first aid grab bags;
  Flare kits;
  Poolside locations—drowning.

FIG. 6 provides another illustration of the emergency device 10 integrated with or located on a life jacket. In this example, the emergency device 10 also includes an extension unit 60 that extends from or is attached onto the device and that provides additional functionality, such as an inflation tube mount.

The extension unit may also be used to hold other accessories, such as a whistle or a light.

FIG. 7 provides several options for fitting or attaching various extension unit onto the rear surface of the housing.

FIG. 8 shows another emergency device in which the rear surface of the housing includes strap retainers for securing a strap onto the emergency device. Using the strap, the emergency device may be easily attached to another device or type of clothing or worn on a wrist. The emergency device may also be included as a pendant.

Figure 9C:
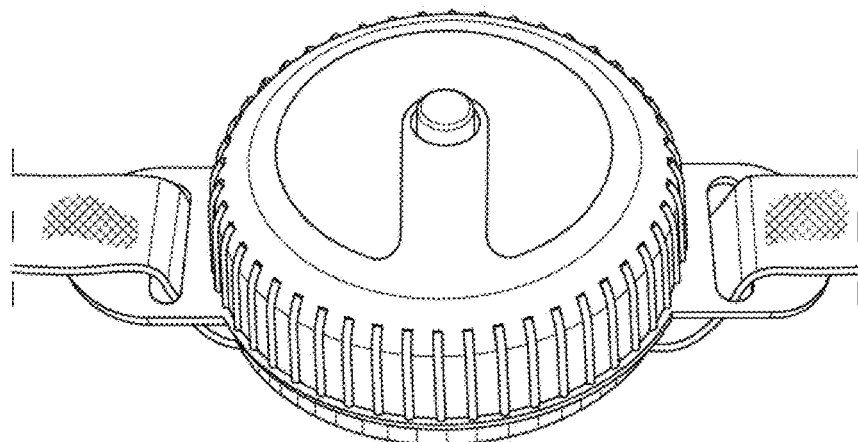
FIGS. 9A-C show examples of emergency devices attached to a strap, each with a different design of the front face of the housing.
Figure 9B:
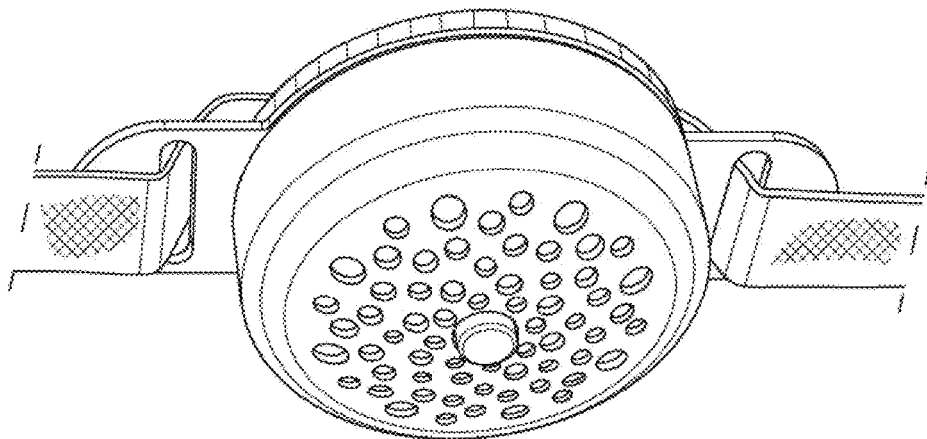
Figure 9A:
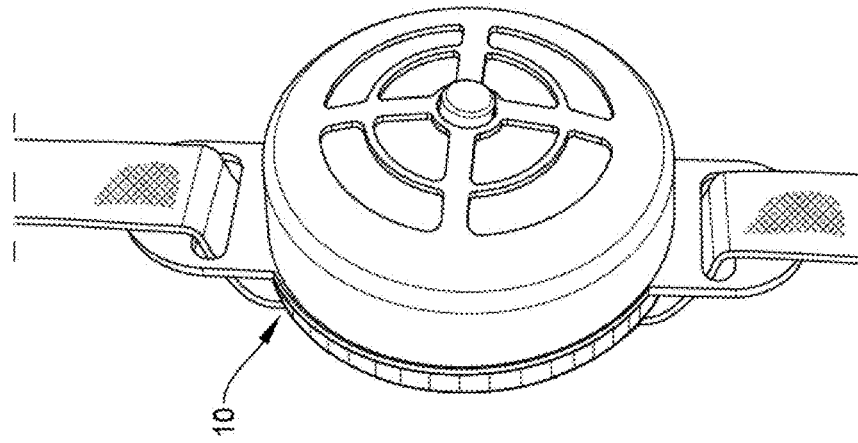
Figure 10C:
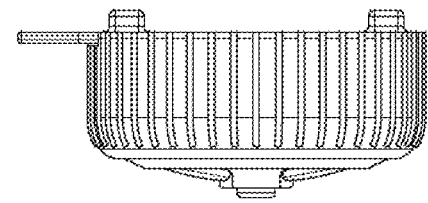
FIGS. 10A-D provide another illustration of the emergency device.
Figure 10B:
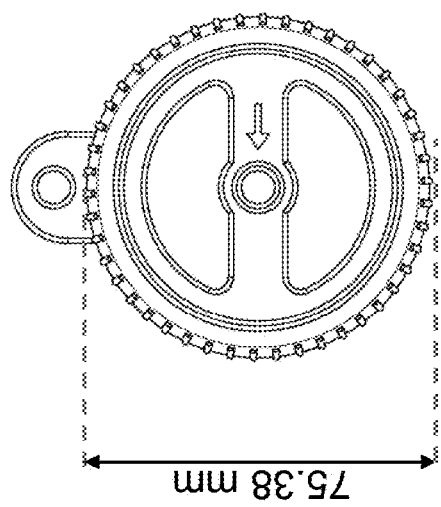
Figure 10D:
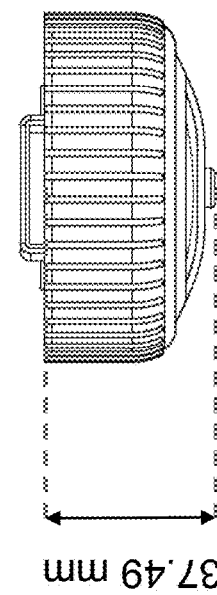
Figure 10A:
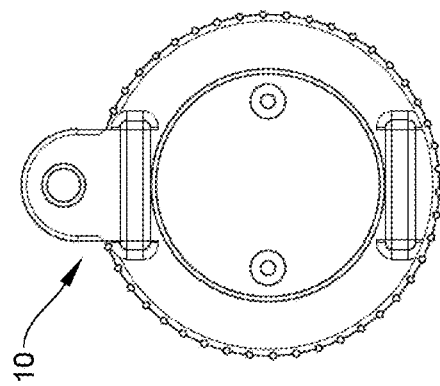
Figure 11C:
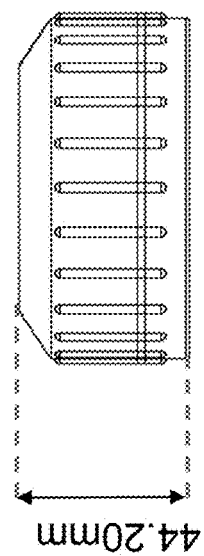
FIGS. 11A-E provide another illustration of the emergency device.
Figure 11B:
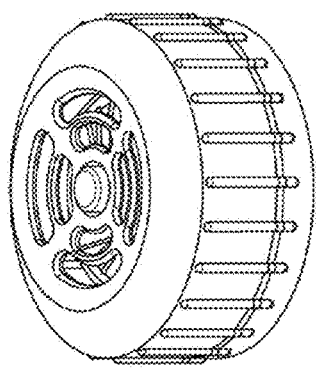
Figure 11A:
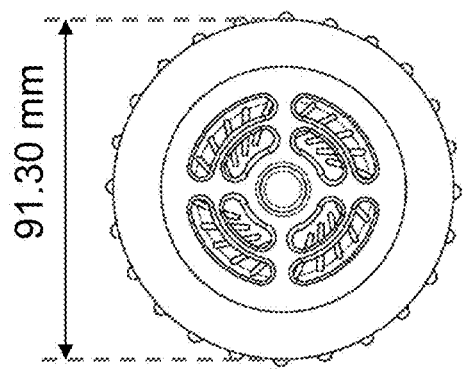
Figure 11E:
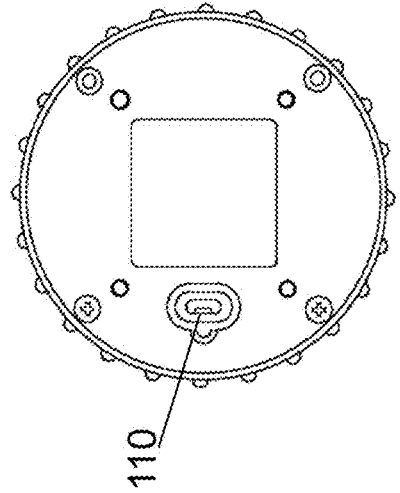
Figure 11D:
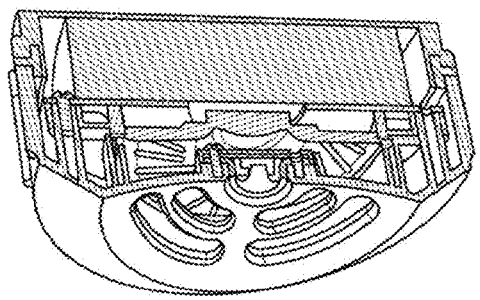

FIG. 9 shows examples of emergency devices attached to a strap, each with a different design of the front face of the housing.

FIG. 10 provides another illustration of the emergency device with a diameter equal to 75.38 mm and a height equal to 37.49 mm. Generally, the overall height of the device is approximately less than 4 cm, and the overall diameter of the housing is approximately less than 8 cm.

FIG. 11 provides another illustration of the emergency device. Generally, the overall height of the device is approximately less than 4.5 cm, and the overall diameter of the housing is approximately less than 9.2 cm. The rear surface of the housing includes a USB socket 110 for recharging the battery located inside the housing.

Other dimensions of the emergency device may be used depending on the type of emergency scenarios. The overall diameter of the housing may be less than 5.1 cm and the overall height of the device may be less than 3.1 cm, resulting in an overall smaller form factor. As an example, this smaller form factor may be used when the emergency device is retrofitted to or integrated as part of a life jacket.

Figure 12:
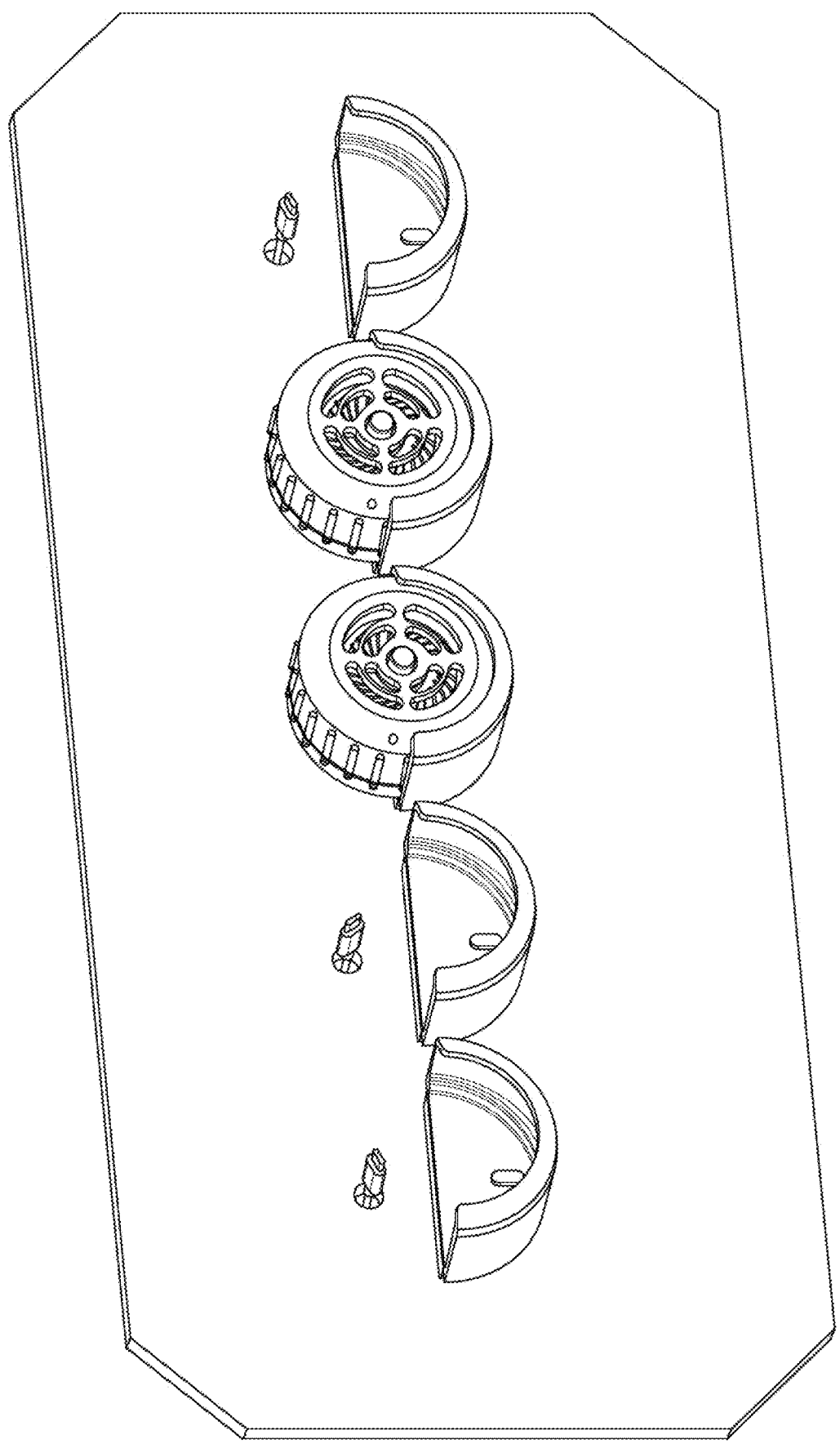
FIG. 12 shows a plurality of emergency devices mounted on a panel.

FIG. 12 shows a plurality of emergency devices mounted on a panel. The panel includes a plurality of openings for easy access of the USB sockets located on the rear surface of the emergency devices. The panel may include holders or attachments that are adapted to receive the emergency devices. Each emergency device is easily removable from each holder or attachment. Because the emergency devices are easily switched and/or replaced, the panel can be adapted to be used in a wide range of emergencies as listed in Appendix C, either in a at home, medical, or any workplace setting.

Alternatively, when wireless power charging, such as inductive wireless charging, is used, the rear surface of the emergency device may not include a USB socket. Consequently, the panel, as shown in FIG. 12, will also not include openings for easy access of the USB sockets. In this case, wireless charger(s) or transmitter(s) may be positioned on or near the panel at a distance enabling energy to be transmitted to the receiver coils located inside the emergency devices.

Figure 13:
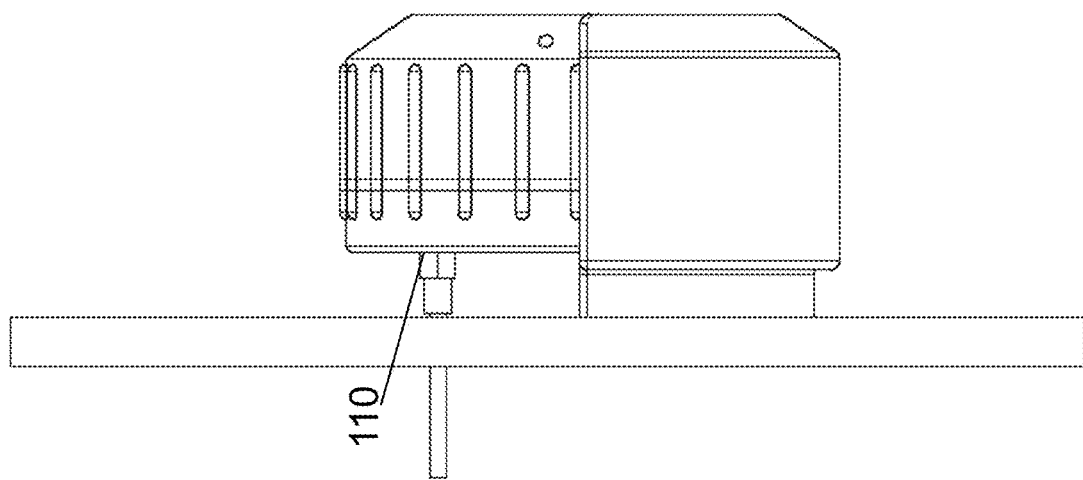
FIG. 13 shows a side view of an emergency device that is securely placed on a holder mounted on a panel and connected to a USB cable.

FIG. 13 shows a side view of an emergency device that is securely placed on a holder mounted on a panel and connected to a USB cable.

Figure 14:
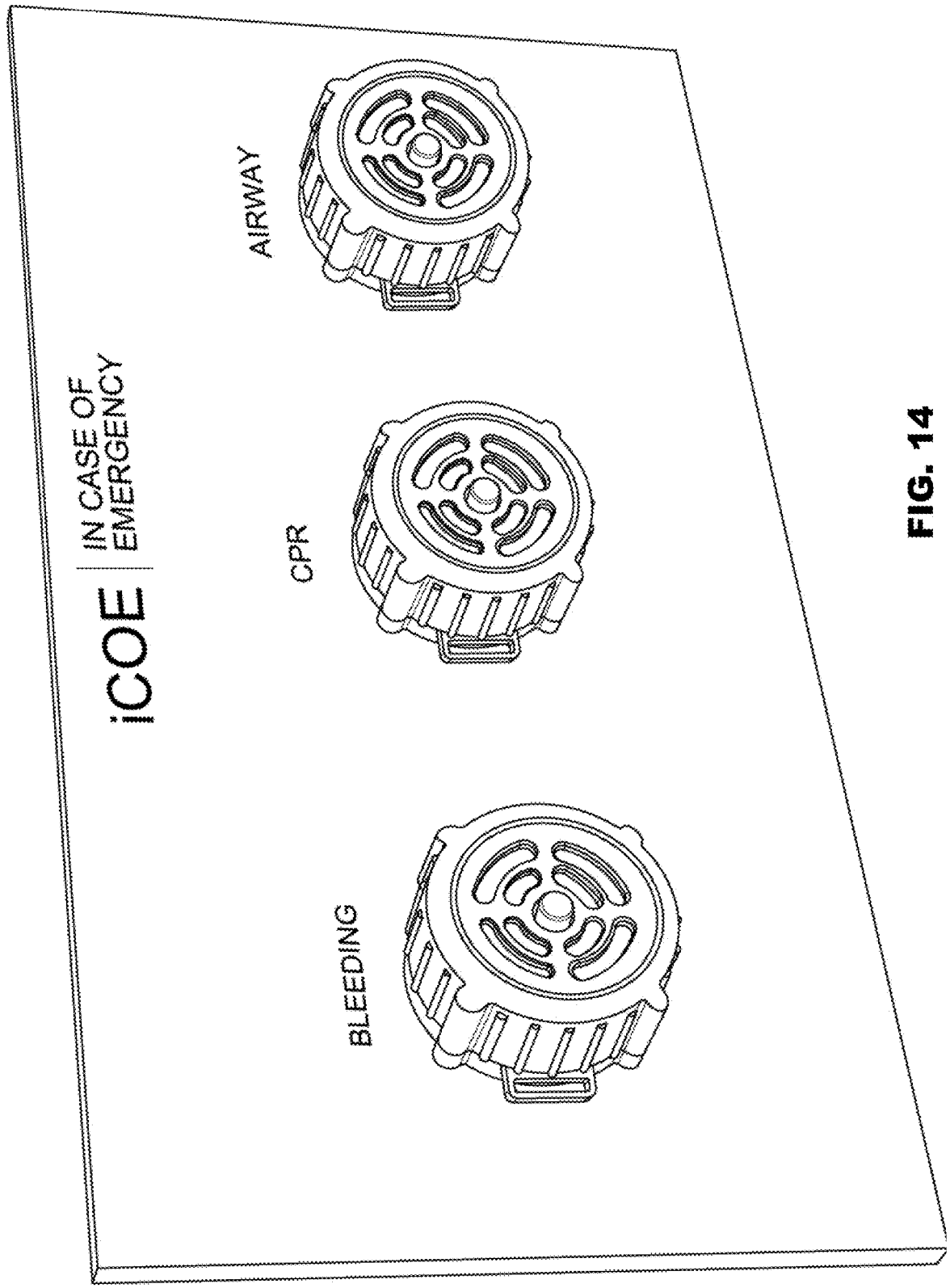
FIG. 14 shows three emergency devices mounted on a panel.

FIG. 14 shows three emergency devices mounted on a panel. Each emergency device includes a memory, such as a reloadable memory, that stores an audio recording that is configured to provide step by step instructions relating to a specific emergency. The panel includes labels that clearly identify the type of emergency that correspond to each emergency device. In the example shown, the emergency devices may be used to play audio recordings that automatically provide bleeding, CPR and airway instructions.

Figure 15:
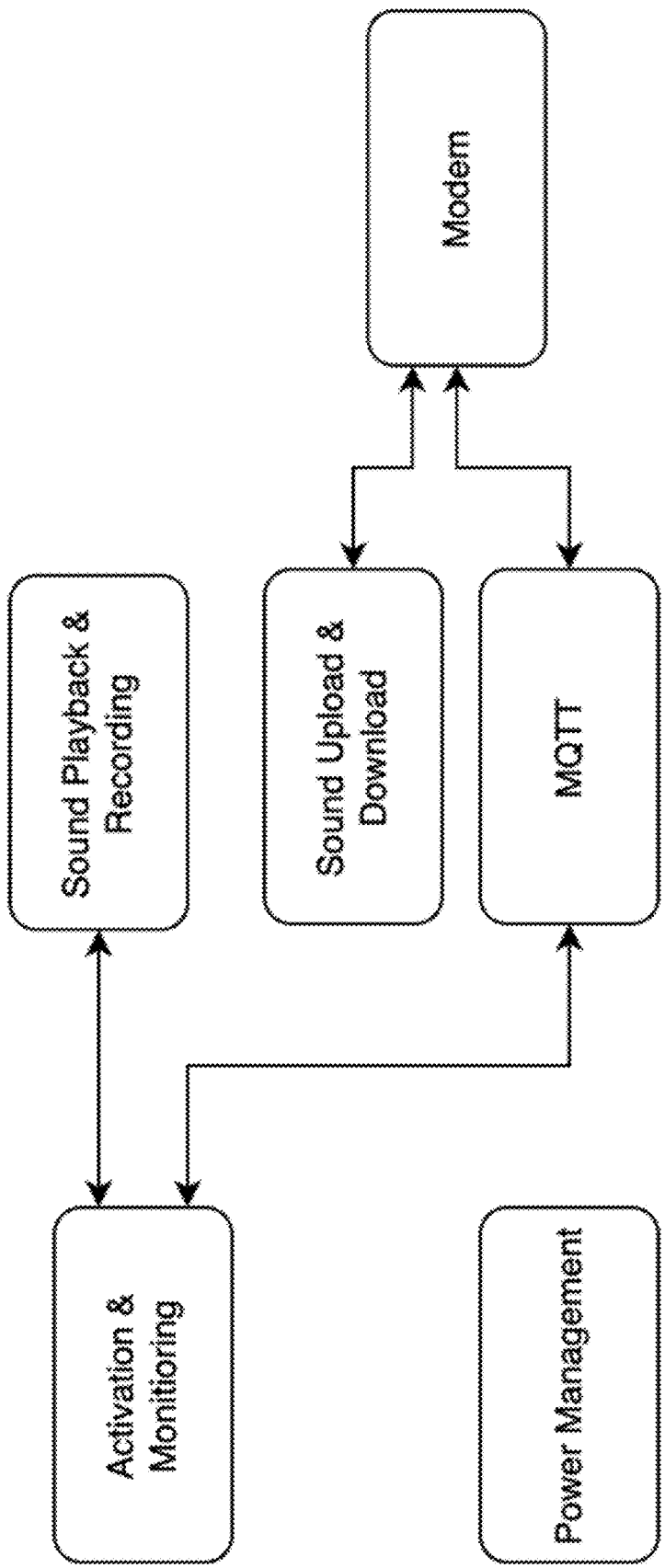
FIG. 15 provides a diagram illustrating the main functionalities and components of the firmware.

FIG. 15 provides a diagram illustrating the main functionalities and components of the firmware:
  Modem—a core modem functionality connects to a network optimising connection speed
  MQTT—via the MQTT protocol, the emergency device will send updates and receive notifications of an update requirement.
  Sound playback and recording—provides the ability of the emergency device to play and/or record sound. Recording may also be provided for upload.
  Activation & monitoring—the emergency device counts the number of activations, interpolate battery levels from usage and general status information and starts on activation. The information is them provided for a MQTT update.
  Power management—to make the battery last a target time period, such as 6 months, without charging, the emergency device needs to sleep and wake periodically to send updates. A dedicated section may be provided in the firmware code. All sections of the code are configured to optimise for power consumption.

Device connection—the emergency device connects using AWS IoT. The emergency device securely acquires credentials either through a SIM provided or during the manufacturing process. The SIM is then locked to the device and the credentials are permanently saved to the device.

Device shadow—synchronisation between the device and the cloud is held within a device shadow. This is a small data structure that stores information between the cloud and the emergency device.

For example, the emergency device may transmit the following data to the cloud: GPS position, signal quality, battery level and/or activation account. The cloud may also transmit the following data to the emergency device: signature required and/or script ID.

Figure 16:
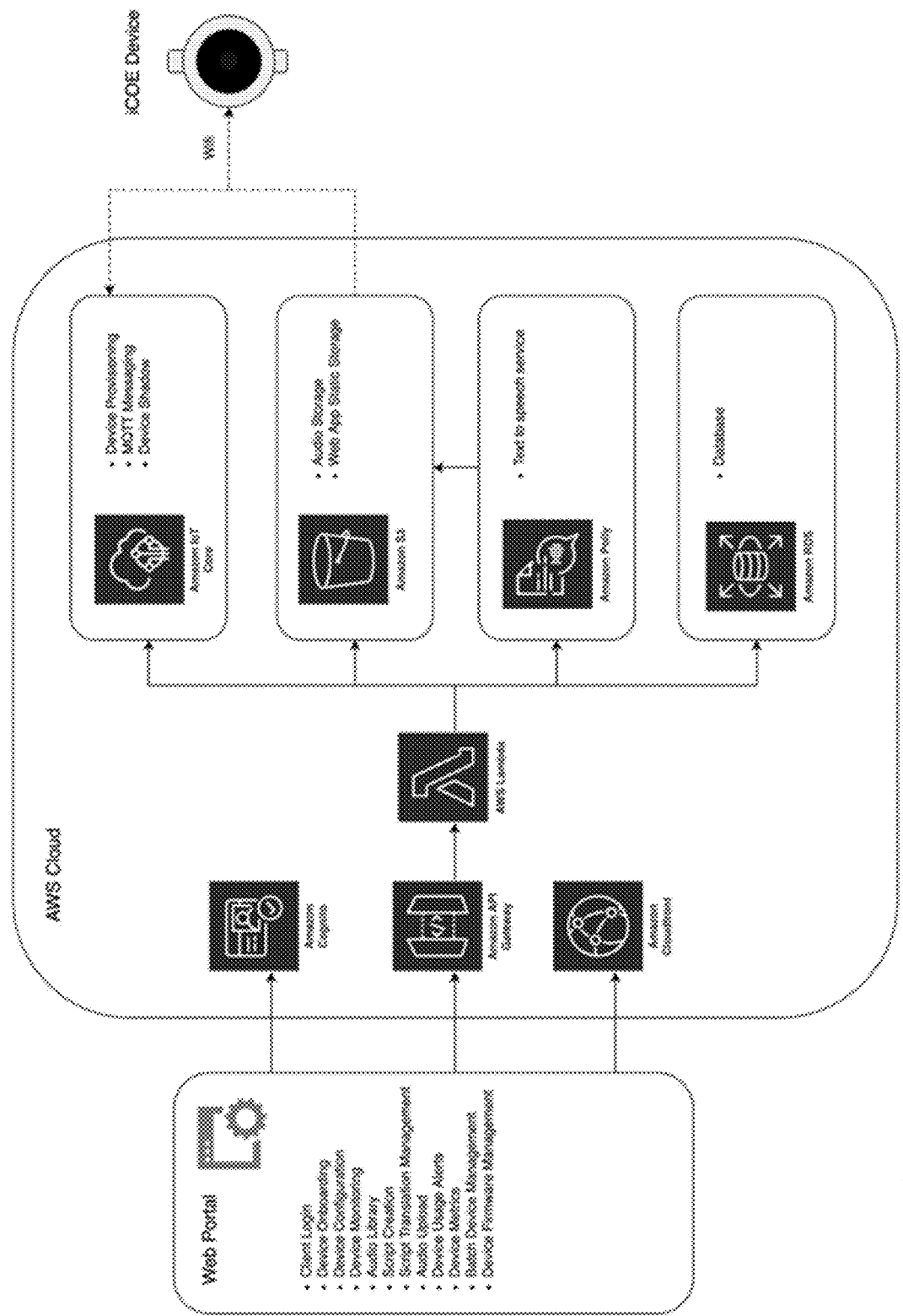
FIG. 16 shows a diagram of the main components of a cloud architecture.

FIG. 16 shows a diagram of the main components of a cloud architecture. The cloud-based backend may host the admin interface allowing an owner of devices to manage and monitor the devices.

A serverless architecture may be used that allows the project to scale without the need of adding further resources.

Figure 17:
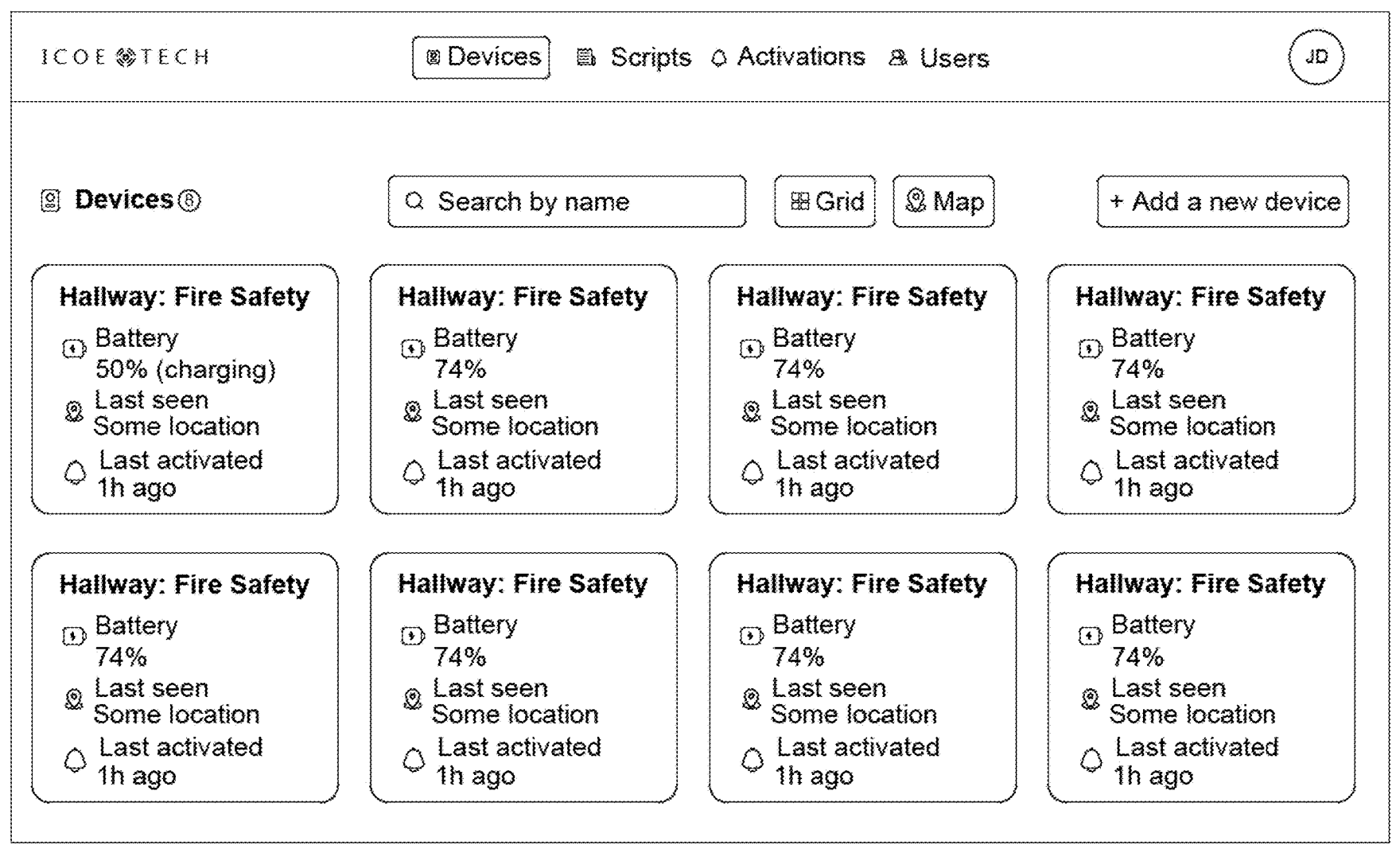
Figure 18:
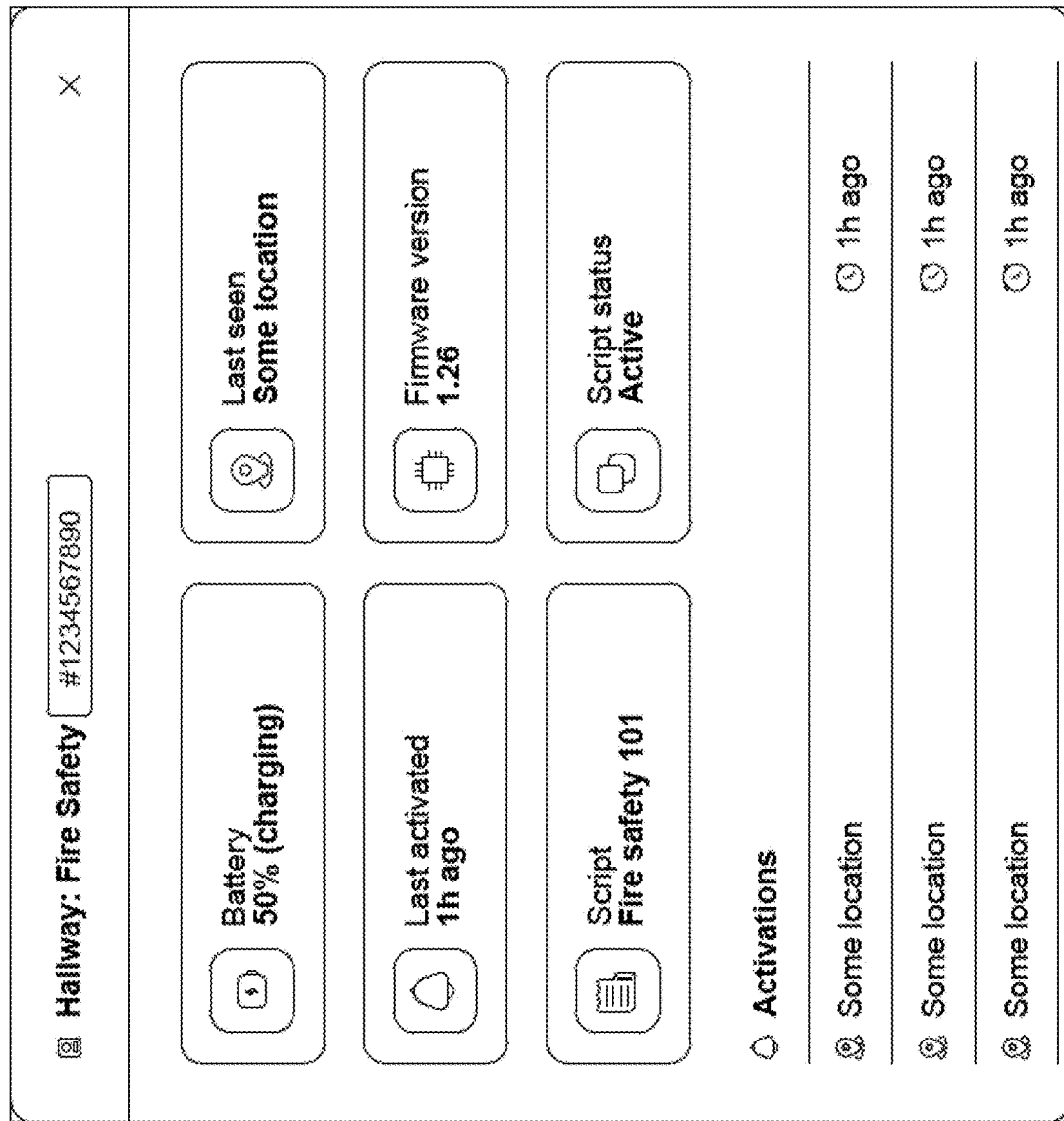
FIG. 18 shows a user interface displaying a device status related information.
Figure 19:
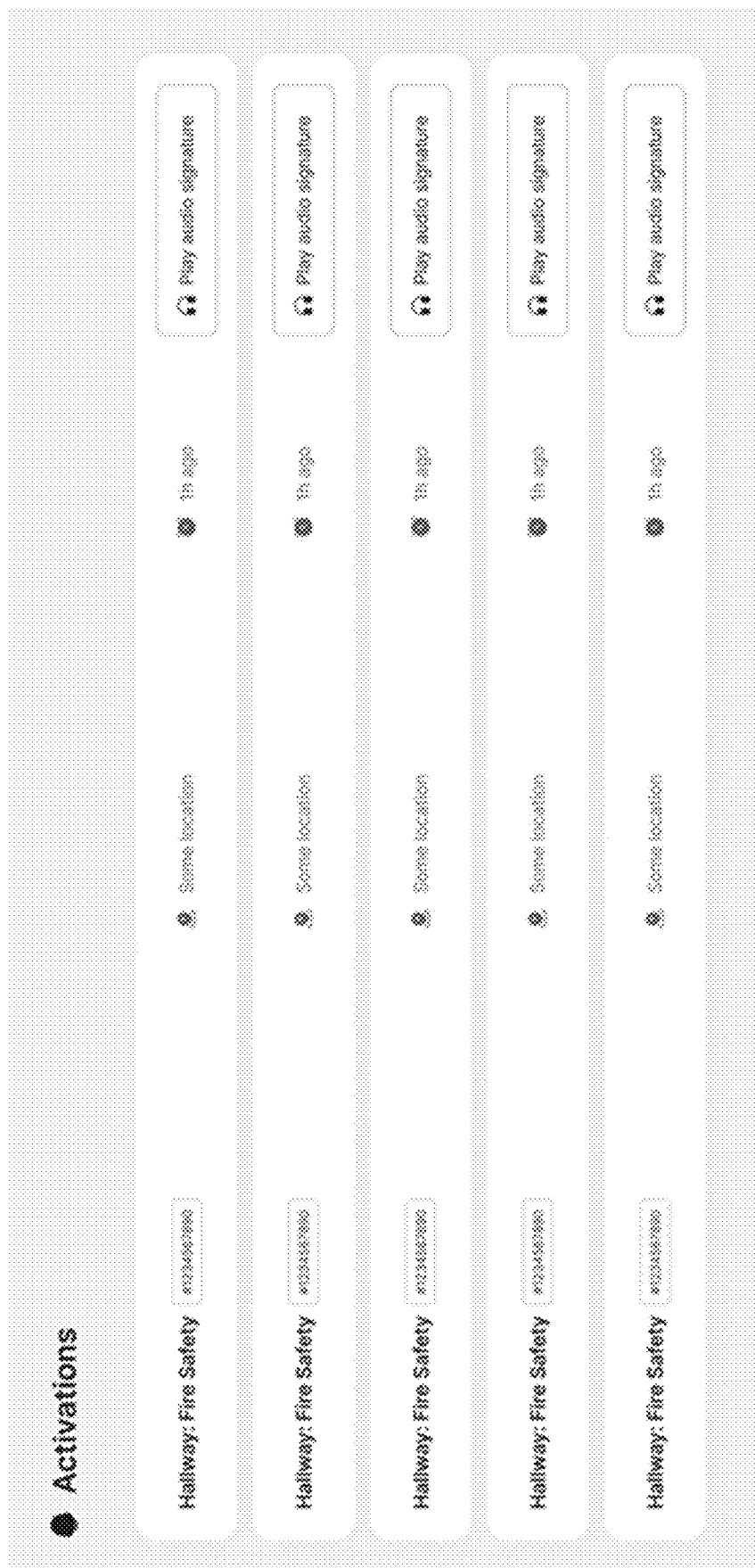
FIG. 19 shows a user interface displaying a list of emergency devices.
Figure 20:
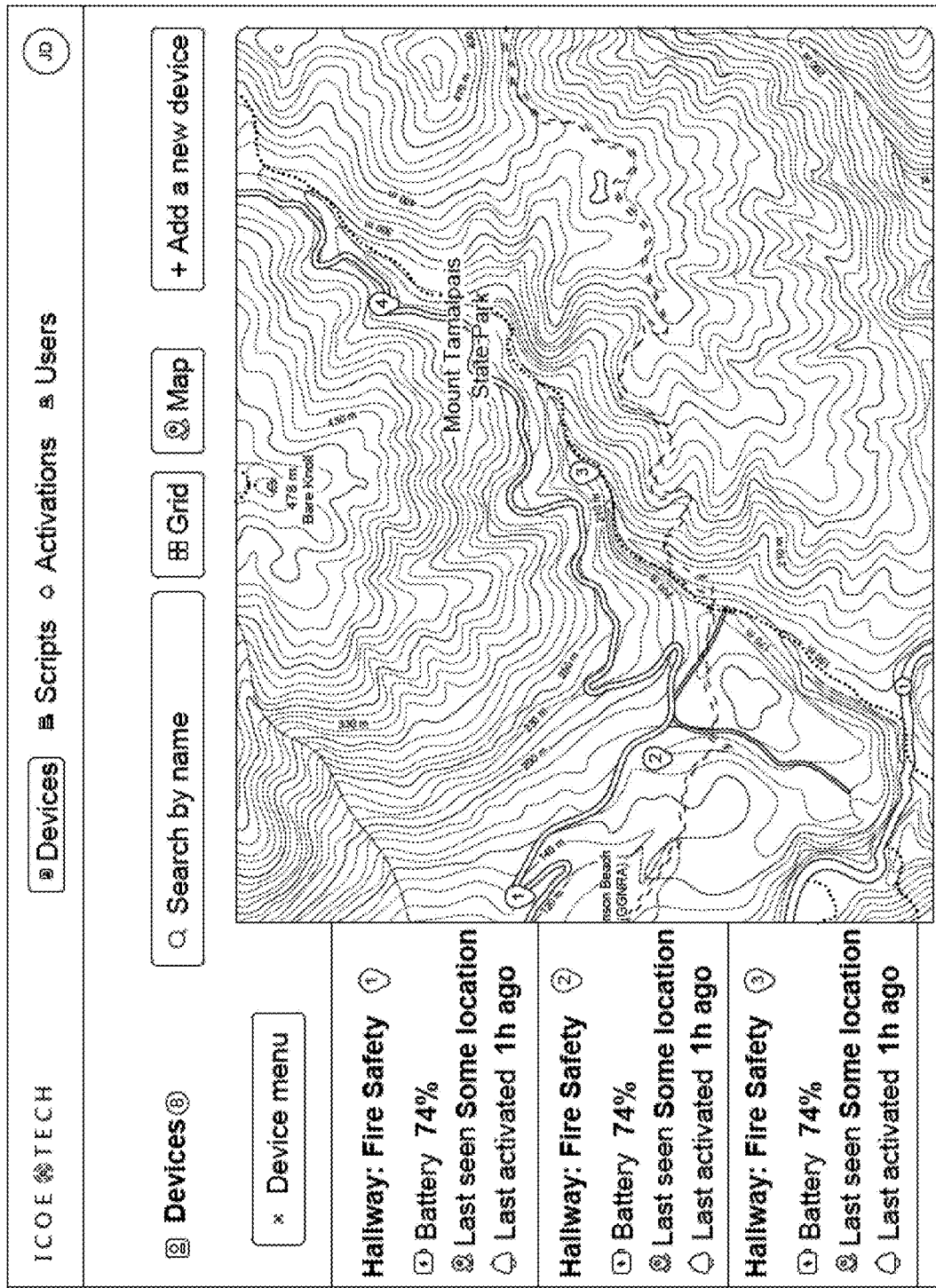
FIG. 20 shows a user interface displaying a map with a list of past or current activations and/or locations of one or more devices.

FIGS. 17 to 22 provides screenshot examples of a user interface. As shown in FIG. 17, the user interface displays the status of one or more devices. Device related status information include one or more of the following: device name, last seen, last activated, battery level and whether the battery is currently being charged. The user interface allows the end-user to also add a new device, search for devices or scripts. As shown in FIG. 18, the user interface displays information related to a specific device. As shown in FIG. 19, the user interface displays a list of past or current activation of several emergency devices. Any events associated with a recording or script may be displayed, such as (a) the time, and/or location of any past or current activation of the device, (b) whether the playback of a recording or script has been completed and the time of completion, and/or location of the device on completion, (c) the receipt of an audio signature or code or recording of that person speaking their name and the time of that receipt and the location of the device on that receipt, (d) any audio content recorded during an activation. As shown in FIG. 20, location and scripts currently loaded on the devices may also be displayed. A map may also be provided with the current or last tracked location of the devices.

Figure 21:
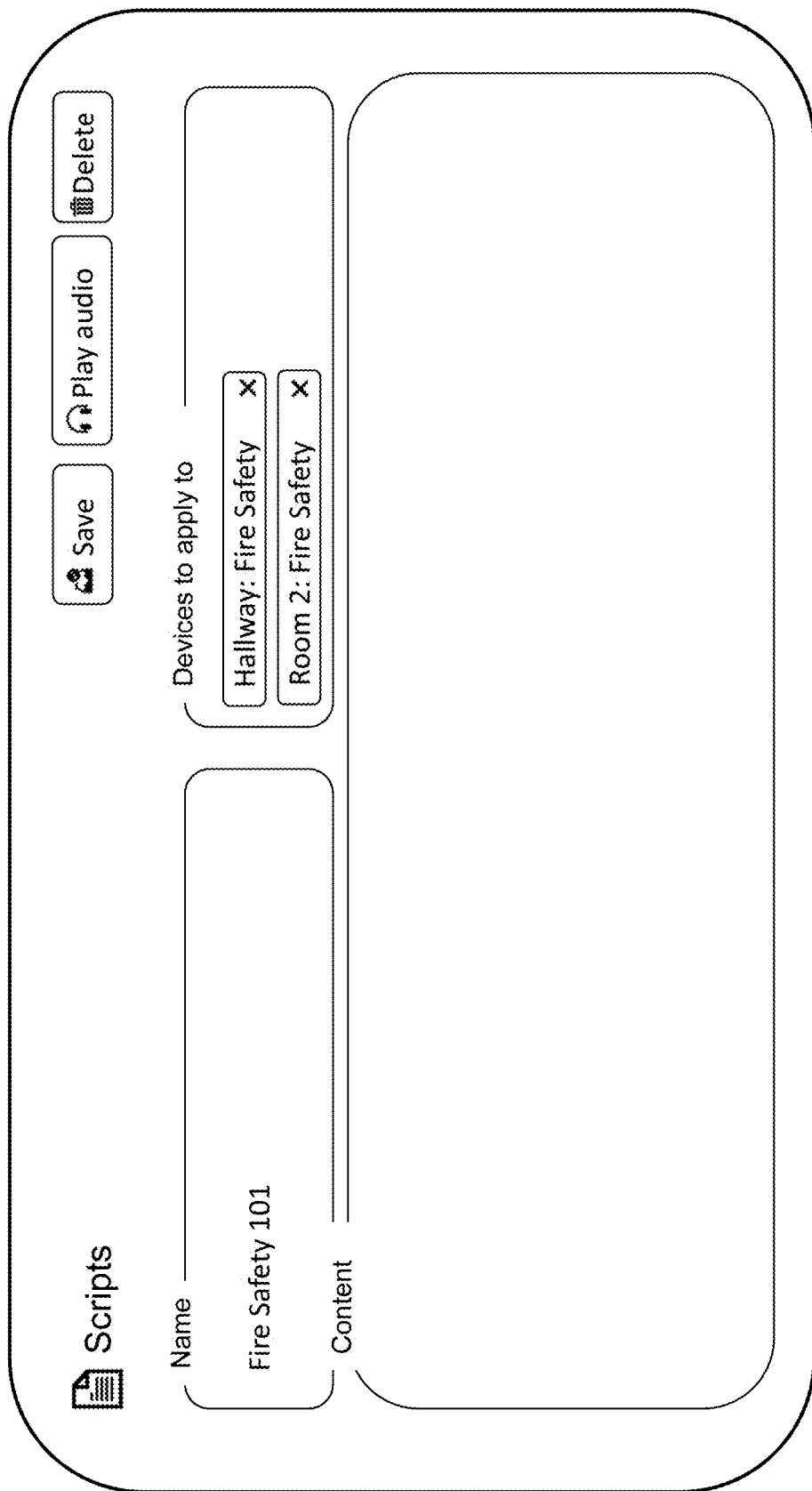
FIG. 21 shows a screenshot of a page for configuring a script.
Figure 22:
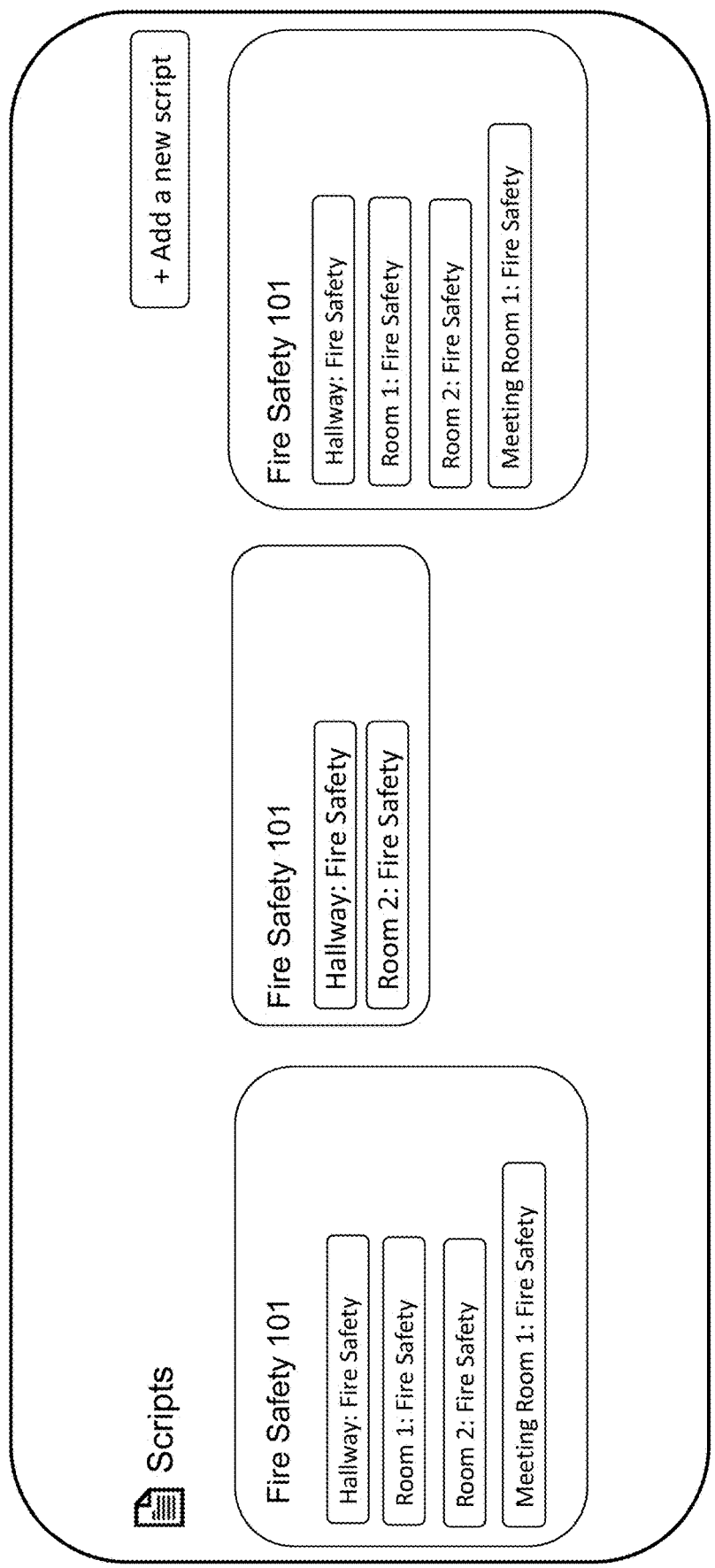
FIG. 22 shows a user interface displaying a list of scripts associated with each device.

FIG. 21 shows a screenshot of a page for configuring a script. A script is a text that is converted by the cloud into a spoken instruction. The user can write the script, then listen to the script and set the device(s) that it should be uploaded onto. Once saved, the next time the device communicates with the cloud it will update and download the spoken script. FIG. 22 shows the user interface displaying for each emergency devices, a list of all the scripts created or uploaded. A repository of default scripts that can be used may also be easily accessible to the end-user and the end-user may just drag and drop any script to be uploaded onto a specific emergency device.

The author of the script may also further program the script to achieve one or more of the following actions: add a pause within the script or between paragraphs or between sentences, emphasize certain words or phrase, play the script in a specific language, use phonetic pronunciation, control volume, speaking rate and/or pitch, play a prompt for a message to be uploaded or recorded.

Multi-step scripts may be used in which an end-user acknowledges listening to one step by pressing a button and then listens to the subsequent step.

The emergency device may also be configured to record a message to send information to the device owner or to the connected cloud or server.

Figure 23:
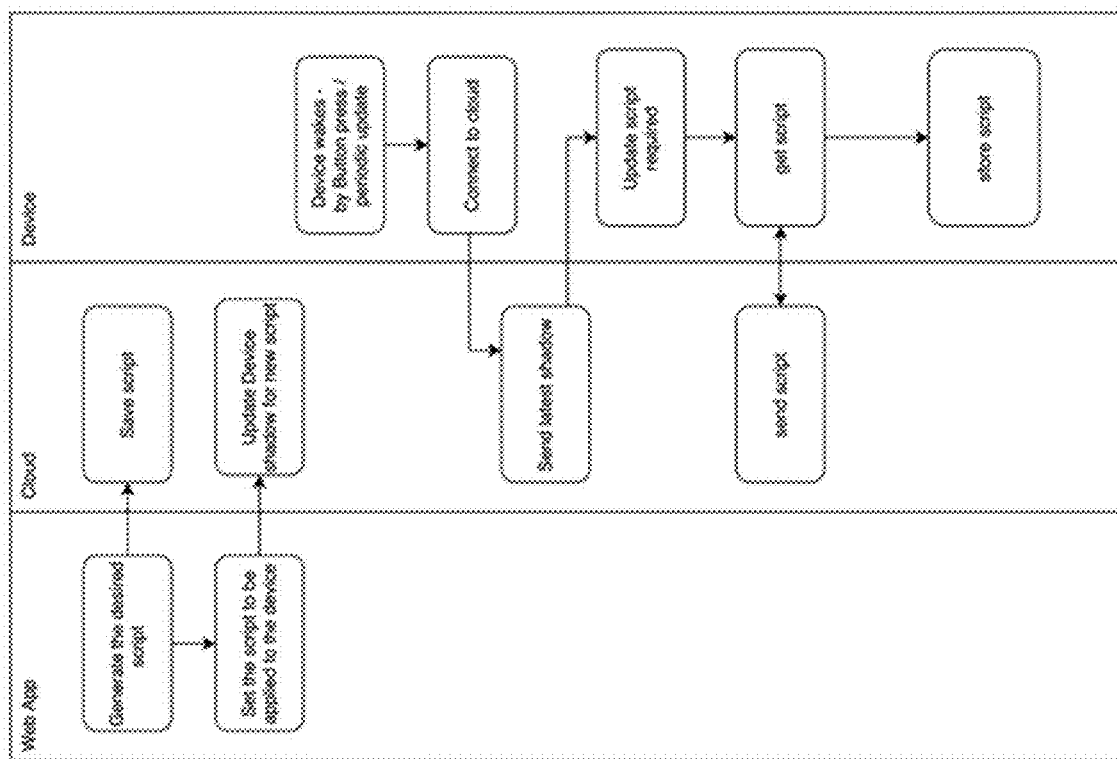
FIG. 23 shows a diagram illustrating the steps from generating a script from the web application to storing a script on the device.

FIG. 23 shows a diagram illustrating the steps from generating a script from the web application to storing a script on the device.

The emergency device is further configured to store or transmit an audit trail associated with the audio recording or script. The audit trail may comprise a history of what scripts were on a device, which user changed the script and when the script was applied to the device. A history of changes to a script may also show a log of its saved history in text form. When a script is changed, the version will be incremented. Each change will show the text script, the author, and the date time that the script was modified. The version of the script will then automatically be shown on the devices. The user interface will also display if a device has a pending script update.

APPENDIX A—WEB SERVER CONFIGURATION

A webserver service provides a set of HTML pages that can be viewed within any HTML compatible web browser [ie. Internet Explorer, Firefox, Google Chrome etc.] or any mobile handheld device [ie. Android, iPhone, iPad etc.].

We now provide an example of a web server configuration.

Logging into the Web Server

Figure 24:
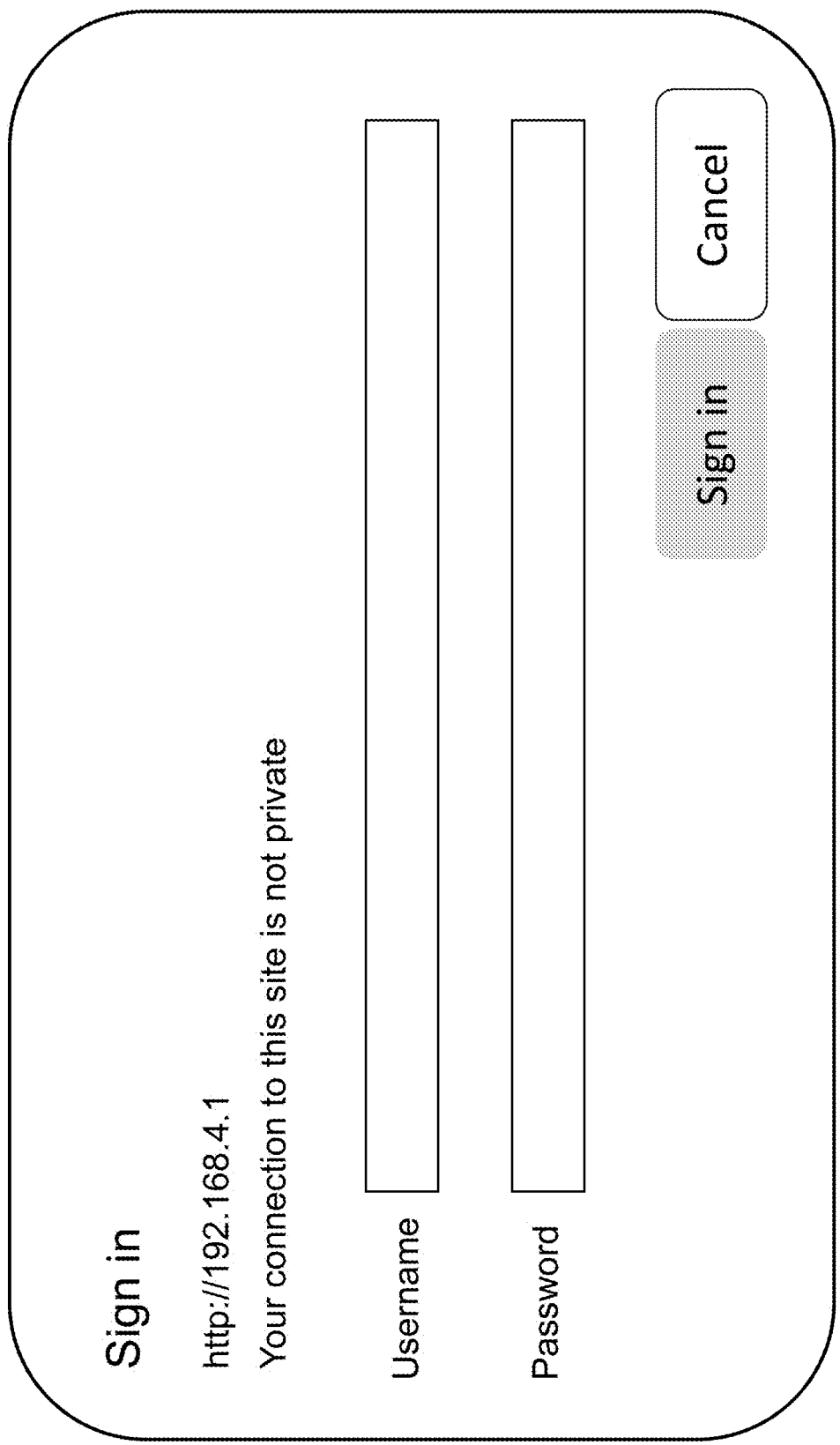
FIG. 24 shows an example of an authentication screen.

On entering 'ICOE' into the browsers URL bar the browser will contact the web server and initiate the authentication process to allow entry into the system. FIG. 24 shows an example of an authentication screen.

At this point the operator may enter the system as a USER, ADMINISTRATOR or FACTORY operator. New accounts may also be configured under a '/config.html' page.

User account: a user account prevents access to the all-configuration options and buttons that could compromise operation.

Administrator account: an administrator account allows the operator to re-configure all options.

Factory account: as the Administrator account but allows access to user configuration /config.html page.

Overview Page

Figure 25:
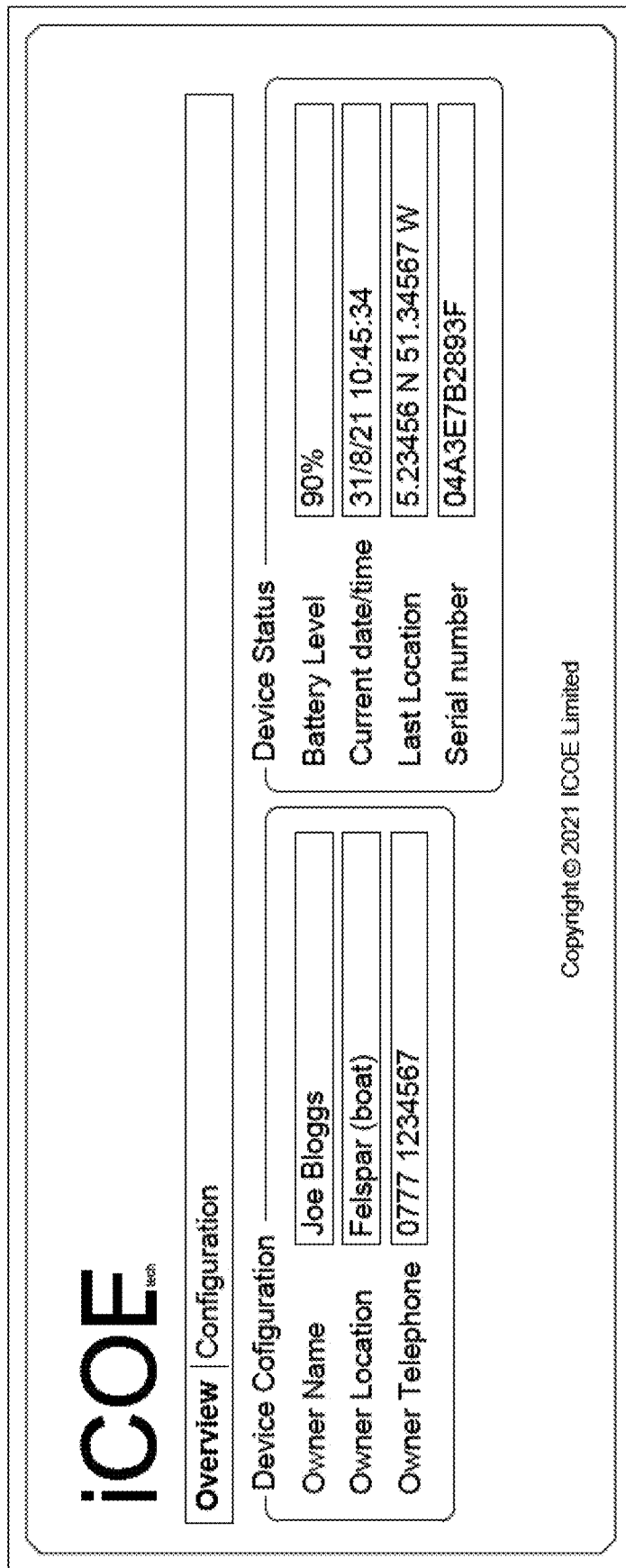
FIG. 25 shows an example of a screenshot of an overview page.

After successful authentication the operator is presented with the initial Overview page which provides an overview of the current ICOE configuration. FIG. 25 shows an example of a screenshot of an overview page.

Configuration Page

FIG. 26 shows an example of a screenshot of a configuration page. Clicking on the configuration menu item the operator is presented with the configuration page which allows the emergency device to be configured.

The System Information and Configuration dialog provides information about the emergency device and allows the Owner name, location and telephone number to be configured.

The Device Configuration dialog allows device setting to be configured, such as:

Button activate period—Period of time in milliseconds that the centre button must be pressed to activate the unit and start an announcement. Range may be for example between 50 ms and 3000 mS.

Button deactivate period—Period of time in milliseconds that the centre button must be pressed and held to deactivate the unit once an announcement has been started. Range may be for example between 500 ms and 10000 mS.

Impact trigger level—Acceleration level in g that the unit must experience to activate the unit and start and announcement. Range may be for example between 1 and 16 g, with a default value being set at about 5 g.

Beacon flash rate—Period of time in milliseconds between each flash of the beacon LED indicator. Range may be for example between 100 ms 30000 mS, with a default value being set at about 1000 mS.

Announcement volume—Volume level for speaker during announcement. Range may be for example between 1 and 10, with a default value being set at about 6.

Enable announcement—Checkbox to enable/disable announcement audio.

Enable beacon—Checkbox to enable/disable the beacon LED indicator.

Enable location—Checkbox to enable/disable GNSS location function.

The Announcement Upload dialog provides a means of uploading an announce.mp3 file which is played back when the unit is activated. Click 'Choose file', navigate to the folder containing the announce.mp3 file, select it and then click 'Upload file' to upload it.

Advanced Configuration Page (Hidden)

Figure 27:
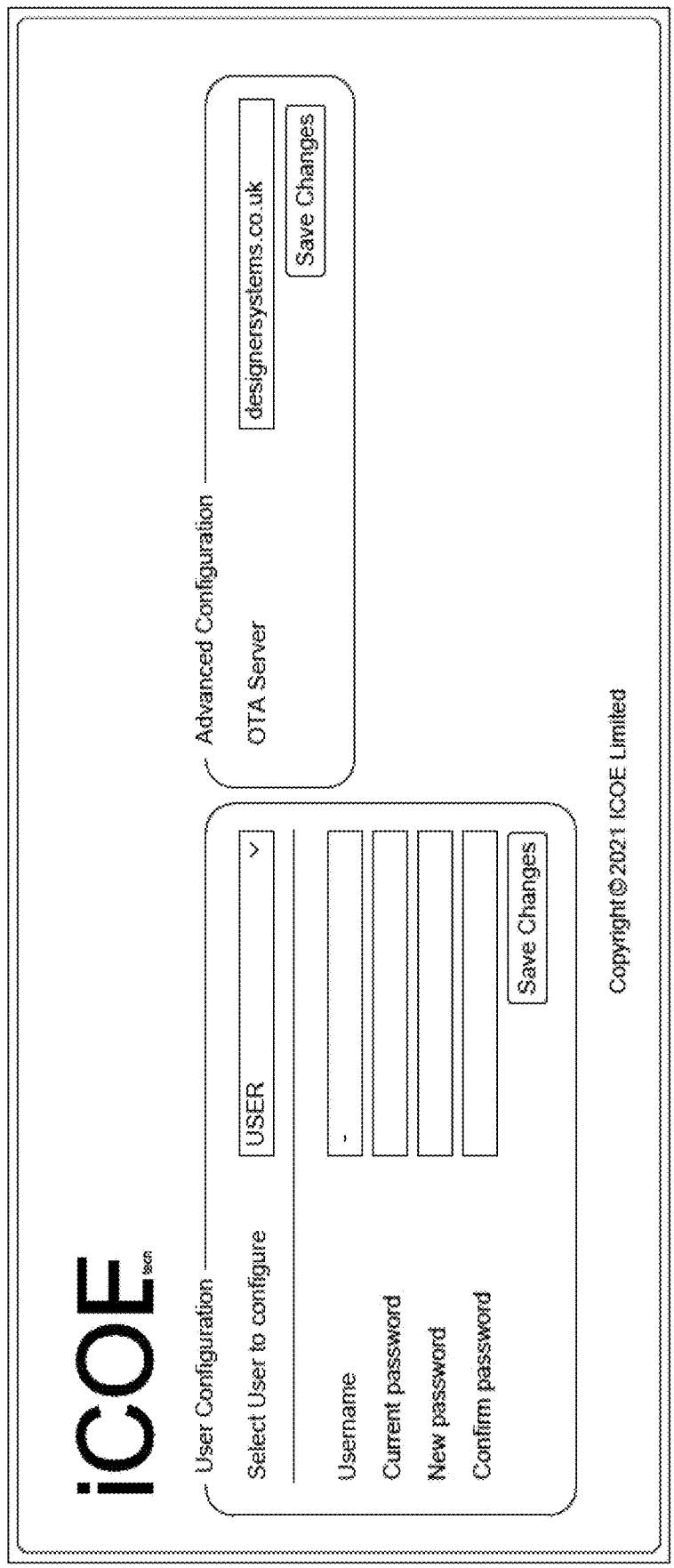
FIG. 27 shows an example of an advance configuration page.
Figure 28:
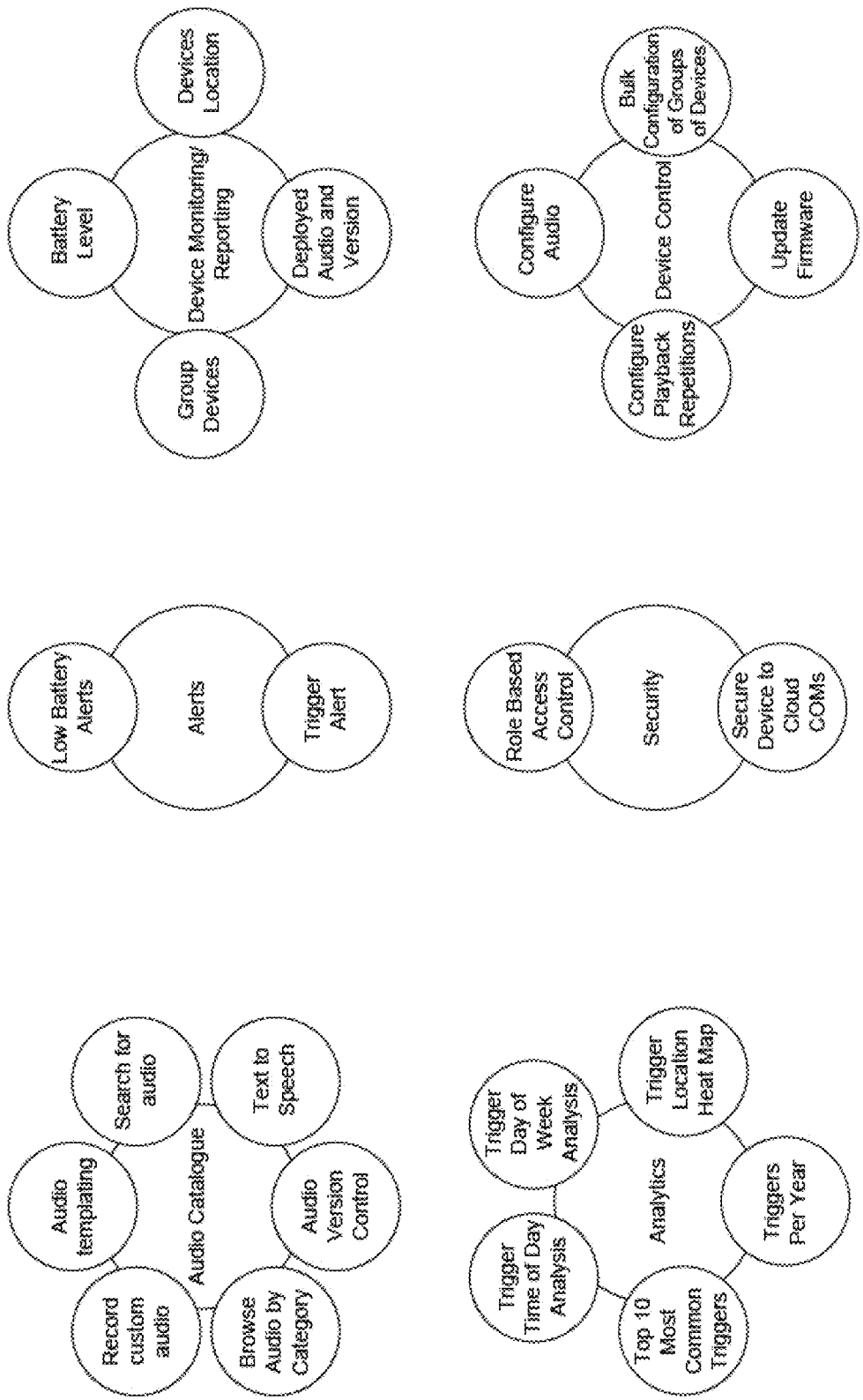
FIG. 28 shows diagrams listing smart functionality features of the emergency system.

FIG. 27 shows an example of an advance configuration page. On entering 'ICOE/config.html' into the browser URL bar the operator is presented with the Advanced Configuration page which allows advanced configuration options for engineer users.

The User Configuration dialog allows the usernames and passwords for the three user levels: USER, ADMINISTRATOR and FACTORY to be configured.

Using the 'Select User to configure' drop down select the user level you wish to configure and then enter a 'Username' the 'Current Password' for the selected user and a 'New Password' and 'Confirm password, clicking on 'Save Changes' to confirm the change.

The Advanced Configuration dialog allows the OTA server to be changed so that software updates can be downloaded automatically.

APPENDIX B—JSON CONFIGURATION AND STATUS FORMAT

Outgoing Messages

The ICOE compiles and sends JSON status messages to the topic on the currently configured AWS server. The status takes the following example format:

```
{
"did": "04A3E7B2893F",
"act": true,
"dtm": "17:09:23 11/06/21",
"blv": 86,
"lat": "5.23456N"
"lng": "51.34567W",
}
```
Parameter: did
Description: Device ID
Format: 6 byte hexadecimal format, range 000000000000 to ffffffffffff
Parameter: act
Description: Device activated, true = activated
Format: Boolean identifier, range 'true' or 'false'
Parameter: dtm
Description: Current system time and date
Format: Variable length ASCII string, range "00:00:00 01/01/01" to "23:59:59 31/12/99"
Parameter: blv
Description: Battery level in %
Format: Variable length decimal, range 0 to 100
Parameter: lat
Description: Current device GNSS latitude + character
Format: Variable length ASCII string, range "90.000000S" to "90.000000N"
Parameter: lng
Description: Current device GNSS longitude + character
Format: Variable length ASCII string, range "180.00000W" to "180.00000E"

Incoming Messages

The ICOE awaits JSON configuration messages on the current topic from the currently configured AWS server. The configuration takes the following example format:

```
{
"ona": "Joe Bloggs",
"olc": "Felspar (boat)",
"otl": "0777 1234567",
"bta": 50,
"btd": 3000,
"itl": 5,
"ber": 1000,
"anv": 6,
"ena": true,
"enb": true,
"enl": true,
"ots": "designersystems.co.uk",
}
```
Parameter: ona
Description: Owner name
Format: Variable length ASCII string, range 1 to 40 characters
Parameter: olc
Description: Owner location
Format: Variable length ASCII string, range 1 to 40 characters
Parameter: otl
Description: Owner telephone number
Format: Variable length ASCII string, range 1 to 40 characters
Parameter: bta
Description: Button activate press period in mS
Format: Variable length decimal, range 50 to 3000, default 50
Parameter: btd
Description: Button deactivate press period in mS
Format: Variable length decimal, range 500 to 10000, default 3000
Parameter: itl
Description: Impact acceleration level in g
Format: Variable length decimal, range 1 to 16, default 5
Parameter: ber
Description: Beacon flash rate in mS
Format: Variable length decimal, range 100 to 30000, default 1000
Parameter: anv
Description: Announcement volume level
Format: Variable length decimal, range 1 to 10, default 6
Parameter: ena
Description: Enable announcement, true = Announcements are made when activated
Format: Boolean identifier, range 'true' or 'false'
Parameter: enb
Description: Enable beacon, true = Beacon flashes when activated
Format: Boolean identifier, range 'true' or 'false'
Parameter: enl
Description: Enable location, true = GNSS locations are taken when activated
Format: Boolean identifier, range 'true' or 'false'
Parameter: ots
Description: OTA Sever address
Format: Variable length ASCII string, range 1 to 40 characters

APPENDIX C—USE CASE EXAMPLES

As discussed above, the emergency device is fully customisable and can therefore be adapted to suit a wide range of markets and/or emergency scenarios, such as, but not limited to:
  Cold water immersion;
  Child choking;
  Anaphylaxis;
  Haemorrhage;
  Seizures;
  Kitchen fire;
  Electrocution;
  Yacht sinking/aground/fire etc.
  Commercial industry health may for example include:
  CPR stations;
  Eye wash stations;
  Crush injury;
  Chemical injury;
  Emergency shower systems;
  Airway instructions;
  Bleeding stations;
  Circulation stations;
  Fire warning stations;
  Evacuation stations;
  Fracture care stations.
  First Aid/Allergy:
  Auto-injectable device (such as an EpiPen) case design—incorporating the speaker into the casing designed around auto-injectable device's so when it is opened instructions are heard;
  Epilepsy;
  Nut allergy stations.
  Baby Care:
  Choking;
  Allergies;
  First contact egg, nuts milk wheat, advice button;
  Baby care;
  Cot safety.
  Hospital/Health:
  Disease specific, such as: diabetes; insulin kit/hypoglycaemia kit.
  Parkinson's, such as detecting if an end-user as not taking their drug.
  Elderly care.
  Personal security button able to be customised with information about vulnerable person to assist return to home or family contact.
  Agriculture—Farms:
  VHF—instruction;
  Chemical—petroleum industry—emergency showers instruction;
  Airline.
  Cabin crew instructional assistant, such as the following:
  Heart attack;
  First aid;
  Allergy reaction.
  Car Industry:
  Changing of a tyre instruction;
  Engine care instruction;
  Emergency;
  Clothing
  Hiking;
  Climbing;
  Canoeing;
  Integration into leisure activity clothing.

APPENDIX D—DEVICE AND CLOUD FUNCTIONALITY AND USER STORIES

Device Functionality:
  Connect to a cellular network.
  Get authentication details for cloud access.
  Authenticate with cloud.
  Upload latest telemetric data: signal quality, battery level, position, activation count.
  Download an audio script.
  Upload an audio file (audio signature).
  Record an audio file.
  Play an audio file.
  Schedule telemetric upload.
  Schedule audio file upload & download.
  Trigger activation to play audio.
  Count the number of activations.
  Indicate no network connection. Possibly an audio script alert or LED.
  Cancel an activation.
  Download firmware, apply and trigger bootloader.
  Multi-test scripts user acknowledges listening to one step by pressing a button then listens to the next.
  Play a secondary prompt for a message to be uploaded.
  Record a message to be uploaded. Not just signatures but messages may be sent to send information to the device owner.
Cloud Functionality:
  Sign up an admin of a company.
  Log in.
  Log out.
  Add device.
  List devices.
  Create text script to open an audio script.
  Edit, listen to and delete scripts.
  Set script to run on the device.
  View telemetric data.
  Admin signs up a company user.
  Admin view company users.
  Audio catalogue—a repository of default scripts that can be used.
  Custom audio—user-recorded content that can be uploaded.
  Analytics—trigger times, frequency, and locations.
  Auditing—a history of what scripts were on a device. Which user changed the script and when the script was applied to the device.
  A history of changes to a script will show a log of its saved history in text form.
  When a script is changed the version will be incremented.
  Each change will show the text script, the author, and the date time that the script was modified.
  The version of the script will be shown on the devices.
  The app will show if a device has a pending script update.
Firmware User Stories:
  The device can automatically provision with the cloud (and show its status).
  The device user can record a response if required and send it back to the cloud.
  The device updates its status with the cloud every hour (SOC, time activated, location, recorded responses—with timestamp).
  The device user can play the stored script when the button is pressed.

The device downloads and stores the script that is assigned to it (each time it changes).

The device user can pause the playback on the device.

The device automatically updates to the latest firmware.

The device user can deactivate the device if activated in error.

Cloud User Stories:

The admin user can sign up a new company (company name, admins first name, admins last name, admins email).

The user can log in.

The user can log out.

The user can add a device to their account.

The user can assign a script to a selection of devices.

The user can name the device.

The user can see a list of devices (name, last seen, SOC, script name, script status, last activated, firmware version).

The user can see all of the devices on a map.

The user can select a device and highlight it on the map.

The user can filter the device list by name.

The user can see a list of activations for a device.

The admin user can create other users (email, first name, last name).

The admin can edit users' information (email, first name, last name).

The admin user can view a list of users.

The admin user can delete users.

The user can delete a script.

The user can playback/preview the script audio in the web app.

A user is notified via email when a device is activated.

The user can see the history of which scripts loaded to a device (show script name, script version, date/time, script status (pending download/active), who changed it).

The user can see the history of edits to a script (script version, date/time changed, which user change it, what it changed to).

The user automatically increment the script version number by editing the script.

The user can see which version of script is on the device/pending download to the device.

Cloud, Firmware, Audio Responses User Stories:

The user can write an additional prompt for audio responses on a script.

The user can view and play the audio responses.

APPENDIX E—KEY FEATURES

This specification discloses the following improvements A-M to available emergency devices or systems. Each Feature A-M listed can be combined with any other Feature A-M; each optional feature defined below can be combined with any Feature and any other optional feature.

Key Feature A: Emergency Device Including Cylindrical Form Factor with a Recessed Front Button or Switch Emergency device comprising:
a housing, in which the housing includes a speaker and a memory for storing an audio recording or script for guiding an end-user through an emergency, in which the housing has a generally cylindrical shape;
a recessed button or switch located on the front face of the housing;
the device being configured to play the audio recording or script via the speaker upon detection of a trigger condition, such as the button or switch being activated.

Key Feature B: Emergency Device that Stores and/or Transmits Audio Signature or Code to Verify Compliance Emergency device comprising:
a housing, in which the housing includes a speaker and a memory for storing an audio recording or script for guiding an end-user through an emergency;
the device being configured to play the audio recording or script when instructed to do so by a person; and to receive, after the audio recording or script has been played, an audio signature, code or recording of that person speaking their name, to verify that the person has listened to the audio recording.

Key Feature C: Emergency Device Stores and/or Transmits Action Note

Emergency device comprising:
a housing, in which the housing includes a speaker and a memory for storing an audio recording or script for guiding an end-user through an emergency and for storing and/or transmitting a voice memo or recording given by a user or responder relating to an action that needs to be taken with the device or the local environment.

Key Feature D: Emergency Device that Stores and/or Transmits Audit Trail

Emergency device comprising:
a housing, in which the housing includes a speaker and a memory for storing an audio recording or script for guiding an end-user through an emergency;
the device being configured to play the audio recording or script and to store and/or transmit an audit trail associated with the audio recording or script.

Key Feature E: Emergency Device is Powered/Charged from a Charging Socket, Such as a USB Emergency device comprising:
a housing, in which the housing includes a speaker and a memory for storing an audio recording or script for guiding an end-user through an emergency;
the device being configured to play the audio recording or script via the speaker upon detection of a trigger condition;
in which the emergency device includes a rechargeable battery and is powered/charged from a charging socket, such as a USB.

Key Feature F: Emergency Device is Pre-Programmed with Several Emergency Scripts or Instructions and the Device May Automatically Select the Appropriate Script Based on the Detection of a Specific Trigger Condition Emergency device comprising:
a housing, in which the housing includes a speaker and a memory for storing an audio recording or script for guiding an end-user through an emergency;
the device being configured to play the audio recording or script via the speaker upon detection of a trigger condition;
in which the emergency device is pre-programmed with several emergency scripts and the device automatically selects the appropriate script based on the detection of a specific trigger condition.

Key Feature G: Emergency Device Includes an Extension Unit that Extends from or is Attached onto the Device and that Provides Additional Functionality Emergency device comprising:
a housing, in which the housing includes a speaker and a memory for storing an audio recording or script for guiding an end-user through an emergency;

the device being configured to play the audio recording or script via the speaker upon detection of a trigger condition;

in which the emergency device includes an extension unit that extends from or is attached onto the device and that provides additional functionality.

Key Feature H: Emergency Device Includes a Biometric Sensor

Emergency device comprising:

a housing, in which the housing includes a speaker and a memory for storing an audio recording or script for guiding an end-user through an emergency; the device being configured to play the audio recording or script via the speaker;

a biometric sensor that is configured to capture biometric information about an end-user and in which the emergency device is configured to verify the identity of the end-user using the biometric sensor.

Key Feature I: Emergency Device Includes a GNSS Receiver and is Configured to Transmit its Location to a Cloud or Central Server Emergency device comprising:

a housing, in which the housing includes a speaker and a memory for storing an audio recording or script for guiding an end-user through an emergency;

the device being configured to play the audio recording or script via the speaker upon detection of a trigger condition.

In which the device includes a GNSS receiver and is configured to determine its geo-location or position and to transmit its location to a cloud or central server.

Key Feature J: Emergency System Including Multiple Emergency Devices Mounted on a Panel, Each Emergency Device being Powered/Charged from a Charging Socket, Such as a USB Emergency system including multiple emergency devices mounted on a panel, each emergency device comprising:

a housing, in which the housing includes a speaker and a memory for storing an audio recording or script for guiding an end-user through an emergency;

the device being configured to play the audio recording or script via the speaker upon detection of a trigger condition;

in which each emergency device includes a rechargeable battery and is powered/charged from a charging socket, such as a USB.

Key Feature K: Emergency System Including Multiple Emergency Devices, that can all be Configured Via a Web App Emergency system including multiple emergency devices mounted on a panel, each emergency device comprising: a housing, in which the housing includes a speaker and a memory for storing an audio recording or script for guiding an end-user through an emergency; in which each emergency device is configured to play the audio recording or script via the speaker upon detection of a trigger condition;

and in which the emergency system includes an application running on a mobile phone or other computing device or a cloud, in which the application includes an interface module configured to allow a user to configure the multiple emergency devices.

Key Feature L: Emergency System Including Multiple Emergency Devices Grouped Together Via a Communication Network Emergency system including multiple emergency devices mounted on a panel, each emergency device comprising:

a housing, in which the housing includes a speaker and a memory for storing an audio recording or script for guiding an end-user through an emergency;

the device being configured to play the audio recording or script via the speaker upon detection of a trigger condition;

in which the multiple emergency devices are configured to communicate via a communication network.

There are several possible implementations of any of the key features above. Examples are now provided with Key features M and N.

Key Feature M: Emergency Device Attached or Integrated to a Life Jacket

A life jacket including an emergency device, the emergency device comprising:

a housing, in which the housing includes a speaker and a memory for storing an audio recording or script for guiding an end-user through an emergency, in which the housing has a generally cylindrical shape;

a recessed button or switch located on the front face of the housing;

the device being configured to play the audio recording or script via the speaker upon detection of a trigger condition, such as the button or switch being activated.

Key Feature N: A Case for an Auto-Injectable Device that is Configured to Automatically Play an Audio Recording or Script Via the Speaker when the Case is Opened A case for an auto-injectable device, the case including a speaker and a memory for storing an audio recording or script for guiding an end-user through an emergency; the case being configured to play the audio recording or script via the speaker when the case is opened.

Generally Applicable Optional Features

The following optional features can also be combined with any key feature above and also any other optional feature. The optional features may also be stand-alone features, independent from features A-M above.

Overall Design

Housing has a generally cylindrical shape.

Housing has a generally cylindrical shape with a recessed front button or switch.

Emergency device includes a button or switch located on the front face of the housing.

Switch is a momentary or tactile switch, with a maximum response time of about 50 ms.

Emergency device includes a charging socket located on the rear face of the housing.

The overall height of the device is approximately less than 4 cm, and the overall diameter of the housing is approximately less than 8 cm.

The overall height of the device is approximately less than 4.5 cm, and the overall diameter of the housing is approximately less than 9.2 cm.

The diameter of the button or switch is approximately less than 6 mm, or less than 5 mm.

Housing includes tactile features, such as bumps, that help define the exterior of the housing.

Housing includes strap retainers for securing a strap onto the emergency device.

Emergency device is portable.
Emergency device can be operated by one hand.
Visual Indicator
Emergency device includes one or more visual indicators that indicate one or more device related status information, such as battery status, alarm condition, device mode, wireless mode, speaker mode.
Device includes a high-power LED beacon light visible as a ring around a front surface of the housing.
Rechargeable Battery
Housing includes a power charging circuit for controlling the charging of the rechargeable battery and control electronics powered by the rechargeable battery.
Emergency device includes a processor that is configured to manage the power delivered to the device in order to extend battery life.
Emergency device is configured to stay on sleeping mode until trigger condition is detected.
Emergency device is charged wirelessly, such as using inductive wireless charging.
Compliance and Traceability
Device or connected device/cloud/server determines if audio signature or code is indicative of compliance rules being met.
The device detects the script has been completed when an end-user records his name or code.
Device or connected application running on a cloud/server automatically sends a flag when compliance rules are met.
Device or connected application running on a cloud/server automatically sends an alert when there is a possibility of non-compliance.
Device is configured to record audio content when instructed to, such as following a specific voice command or other trigger condition.
Audit trail includes data related to any events associated with a recording or script, such as (a) the time, and/or location of any past or current activation of the device, (b) whether the playback of a recording or script has been completed and the time of completion, and/or location of the device on completion, (c) the receipt of an audio signature or code or recording of that person speaking their name and the time of that receipt and the location of the device on that receipt, (d) any audio content recorded during an activation.
Audio trail data is associated with a tamper-resistant or tamper-evident timestamp.
Audio trail data is tamper-resistant or tamper-evident to meet applicable evidentiary standards.
Audio trail data is encrypted.
Operational Conditions
Emergency device is waterproof.
Emergency device is configured to operate over a wide range of temperatures, such as from about −20 degree Celsius to +85 degree Celsius.
Emergency device is configured to operate over a humidity of up to 100%.
Sensor Network
Emergency device includes a sensor network, comprising various sensors that are configured to detect one or more trigger conditions.
The sensor network comprises one or more of the following: a 3-axis accelerometer, inertial, temperature, mechanical, water, humidity or sound sensor.
Emergency device includes biometric sensors or environmental sensors.
Emergency device includes a communication chip to communicate with other connected devices.
Emergency device is configured to share data with a central server.
Biometric Sensor
The device is configured to verify the identity of the end-user using a biometric sensor before playing the audio recording or script.
Web-App
Emergency device communicates with a connected application running on a mobile phone or other computing device or a cloud.
Application includes an interface module that allows a user to select or enter an audio script for a specific emergency device.
Interface module enables an end-user to schedule the upload of an audio script.
Interface module displays a list of devices and associated status related data.
Interface module displays a list of scripts associated with an emergency device.
Interface module displays a map with the current or last tracked location of the emergency device.
Status related data associated with the emergency device is overlaid on an interactive map.
Emergency device transmits status related data to a cloud or connected computing device, where status related data includes: device ID, Geo-localisation, signal quality, battery level, trigger condition activated, script activation.
Cloud or connected computer device transmits configuration related data to the emergency device, such as signature required, script ID.
Application stores history of any changes made to a script, such as author, date time script was modified, changes made, past or current activation.
Application stores all scripts created for a device in a library.
Life Jacket
Emergency device is integrated into or attached to a life jacket.
Emergency device includes an extension that holds accessories, such as inflation tube mount, whistle, or light.
Fire Extinguisher
Emergency device is part of a fire extinguisher and a trigger condition includes a pin from a fire extinguisher being pulled.
Note
It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:
1. An emergency device comprising:
a housing, in which the housing includes a speaker and a memory for storing an audio guidance, namely an audio recording or script for guiding an end-user through an emergency, and for storing and/or transmit- ting a voice memo or recording made by a user responding to the audio guidance; and a single recessed button or switch located on the front face of the housing configured to initiate the audio guidance; and in which the device is being configured to play the audio recording or script when instructed to do so by a person; and to receive, after the audio recording or script has been played, an audio signature, code or recording of that person speaking their name, to verify that the person has listened to the audio recording.

2. The emergency device of claim 1, the device being configured to play the audio recording or script via the speaker upon detection of a trigger condition.

3. The emergency device of claim 1, in which the device is being configured to play the audio recording or script and to store and/or transmit an audit trail associated with the audio recording or script.

4. The emergency device of claim 1, in which the device is powered or charged from a charging socket.

5. The emergency device of claim 1, in which the device is pre-programmed with several emergency scripts and the device may automatically select the appropriate script based on the detection of a specific trigger condition.

6. The emergency device of claim 1, in which the device includes an extension unit that extends from or is attached onto the device and that provides additional functionality.

7. The emergency device of claim 1, in which the device a biometric sensor that is configured to capture biometric information about an end-user and in which the emergency device is configured to verify the identity of the end-user using the biometric sensor.

8. The emergency device of claim 1, in which the device includes a GNSS receiver and is configured to determine its geo-location or position and to transmit its location to a cloud or central server.

9. The emergency device of claim 1, in which the housing has a generally cylindrical shape and in which the overall height of the housing is approximately less than 4 cm, and the overall diameter of the housing is approximately less than 8 cm.

10. The emergency device of claim 1, in which the housing has a generally cylindrical shape, and in which the overall height of the housing is approximately less than 4.5 cm, and the overall diameter of the housing is approximately less than 9.2 cm.

11. The emergency device of claim 1, in which the device includes a high-power LED beacon light visible as a ring around a front surface of the housing.

12. The emergency device of claim 1, in which the device includes a power charging circuit for controlling the charging of a rechargeable battery and control electronics powered by the rechargeable battery.

13. The emergency device of claim 1, in which the device is configured to stay on sleeping mode until a trigger condition is detected.

14. The emergency device of claim 1, in which the device or a connected application running on a cloud or server determines if an audio signature or code is indicative of compliance rules being met.

15. The emergency device of claim 1, in which the device is configured to detect that the audio recording or script has been completed when a person records his name or code.

16. The emergency device of claim 1, in which the device or connected application automatically sends a flag when compliance rules are met.

17. The emergency device of claim 1, in which the device is configured to record audio content when instructed to.

18. The emergency device of claim 1, in which an audit trail includes data related to any events associated with a recording or script, including one or more of the following: (a) the time, and/or location of any past or current activation of the device, (b) whether the playback of a recording or script has been completed and the time of completion, and/or location of the device on completion, (c) the receipt of an audio signature or code or recording of that person speaking their name and the time of that receipt and the location of the device on that receipt, (d) any audio content recorded during an activation.

19. The emergency device of claim 18, in which the audio trail data is associated with a tamper-resistant or tamper-evident timestamp.

20. The emergency device of claim 1, in which the device includes a sensor network, comprising various sensors that are configured to detect one or more trigger conditions.

21. The emergency device of claim 1, in which the device includes a communication chip to communicate with other emergency devices or connected devices.

22. The emergency device of claim 1, in which the device communicates with a connected application running on a mobile phone or other computing device or a cloud.

23. The emergency device of claim 1, in which a connected application includes an interface module that allows a user to select or enter an audio script for a specific emergency device.

24. The emergency device of claim 1, in which a connected application includes an interface module displays a list of devices and associated status related data, and/or that displays a list of scripts associated with each emergency device.

25. The emergency device of claim 1, in which a connected application includes an interface module displays a map with the current or last tracked location of the emergency device.

26. The emergency device of claim 1, in which the device transmits status related data to a cloud or connected computing device, where status related data includes: device ID, geo-localisation, signal quality, battery level, trigger condition activated, script activation.

27. The emergency device of claim 1, in which the Cloud or connected computer device transmits configuration related data to the emergency device.

28. A life jacket including an emergency device, the emergency device comprising:

a housing, in which the housing includes a speaker and a memory for storing an audio guidance, namely an audio recording or script for guiding an end-user through an emergency, and for storing and/or transmitting a voice memo or recording made by a user responding to the audio guidance; and a single recessed button or switch located on the front face of the housing configured to initiate the audio guidance; and in which the device is being configured to play the audio recording or script when instructed to do so by a person; and to receive, after the audio recording or script has been played, an audio signature, code or recording of that person speaking their name, to verify that the person has listened to the audio recording.

29. An emergency system including multiple emergency devices mounted on a panel, each emergency device comprising:
- a housing, in which the housing includes a speaker and a memory for storing an audio guidance, namely an audio recording or script for guiding an end-user through an emergency, and for storing and/or transmitting a voice memo or recording made by a user responding to the audio guidance; and a single recessed button or switch located on the front face of the housing configured to initiate the audio guidance;
- and in which the multiple emergency devices are configured to communicate via a communication network; and
- in which the device is being configured to play the audio recording or script when instructed to do so by a person; and to receive, after the audio recording or script has been played, an audio signature, code or recording of that person speaking their name, to verify that the person has listened to the audio recording.

* * * * *